United States Patent
Nishimura

(10) Patent No.: US 9,257,035 B2
(45) Date of Patent: Feb. 9, 2016

(54) REMOTE CONTROL DEVICE, REMOTE CONTROL SYSTEM, AND STORAGE MEDIUM STORING CONTROL PROGRAM, AND MEDIUM TO BE ATTACHED TO ELECTRICAL DEVICE

(75) Inventor: Fuminori Nishimura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 30 days.

(21) Appl. No.: 13/479,613

(22) Filed: May 24, 2012

(65) Prior Publication Data

US 2012/0299709 A1   Nov. 29, 2012

(30) Foreign Application Priority Data

May 27, 2011   (JP) ................................. 2011-119689

(51) Int. Cl.
| | | |
|---|---|---|
| G05B 11/01 | (2006.01) | |
| G08C 17/02 | (2006.01) | |
| G05B 19/042 | (2006.01) | |

(52) U.S. Cl.
CPC ............ *G08C 17/02* (2013.01); *G05B 19/0426* (2013.01); *G05B 2219/23039* (2013.01); *G05B 2219/2615* (2013.01); *G08C 2201/92* (2013.01); *G08C 2201/93* (2013.01)

(58) Field of Classification Search
CPC .............. G08C 17/02; G08C 2201/91; G08C 2201/93; G08C 19/16; H04N 5/765; H04N 5/775; H04N 21/4126; H04N 21/42226; G05B 19/0426; G05B 2219/23039; G05B 2219/25082

USPC .......... 340/12.21, 12.22, 12.23, 12.24, 12.25, 340/12.26, 12.51, 12.54, 13.24, 4.11, 4.12, 340/4.3, 4.31, 4.32, 4.33, 4.34

See application file for complete search history.

(56) References Cited

U.S. PATENT DOCUMENTS 6,160,491 A * 12/2000 Kitao et al. ................ 340/12.28
2004/0070491 A1 * 4/2004 Huang et al. ................ 340/10.5
(Continued)

FOREIGN PATENT DOCUMENTS

| JP | 6-141257 A | 5/1994 |
|---|---|---|
| JP | 2001237925 A | 8/2001 |
| JP | 2007116270 A | 5/2007 |
| JP | 200938482 A | 2/2009 |
| JP | 201129919 A | 2/2011 |

OTHER PUBLICATIONS

Office Action mailed Aug. 12, 2014, corresponding to Japanese patent application No. 2011-119689, for which an explanation of relevance is attached.
Office Action mailed Mar. 24, 2015, corresponding to Japanese patent application No. 2011-119689, for which an explanation of relevance is attached.

*Primary Examiner* — Nabil Syed
(74) *Attorney, Agent, or Firm* — Hauptman Ham, LLP

(57) ABSTRACT

According to an aspect, a remote control device includes a display unit, an operation detecting unit, a reading unit, a control unit, and a code transmitting unit. The operation detecting unit detects an operation. The reading unit reads information used for remotely controlling an electrical device from the electrical device. The control unit causes the display unit to display a control screen used for remotely controlling the electrical device based on the information read by the reading unit. The code transmitting unit transmits a control code acquired based on the information read by the reading unit to the electrical device in response to an operation detected by the operation detecting unit while the control screen is displayed on the display unit.

12 Claims, 16 Drawing Sheets

(56) References Cited

U.S. PATENT DOCUMENTS

2007/0296604 A1* 12/2007 Koyata ................. 340/825.22
2008/0198034 A1* 8/2008 Nakano ................ 340/825.22
2010/0317332 A1* 12/2010 Bathiche et al. ............. 455/418
2011/0114716 A1* 5/2011 Pratt .............................. 235/375
2012/0124245 A1* 5/2012 Reeves et al. ..................... 710/8

* cited by examiner

FIG.5

| MODEL CODE | FORM INFORMATION | FEATURE INFORMATION |
|---|---|---|
| TV11 | ... | ... |
| | | ... |
| AD22 | ... | ... |
| AC33 | ... | ... |
| LT44 | ... | ... |
| | | ... |
| | | ... |

| MODEL CODE | FUNCTION | CONTROL CODE |
|---|---|---|
| TV11 | POWER ON | ... |
| | POWER OFF | ... |
| | CHANNEL UP | ... |
| | CHANNEL DOWN | ... |
| | VOLUME UP | ... |
| | VOLUME DOWN | ... |
| | ... | ... |
| AD22 | POWER ON | ... |
| | POWER OFF | ... |
| | SELECT SOURCE | ... |
| | VOLUME UP | ... |
| | VOLUME DOWN | ... |
| | ... | ... |
| AC33 | POWER ON | ... |
| | POWER OFF | ... |
| | TEMPERATURE UP | ... |
| | TEMPERATURE DOWN | ... |
| | ... | ... |
| LT44 | POWER ON | ... |
| | POWER OFF | ... |
| | BRIGHTNESS UP | ... |
| | BRIGHTNESS DOWN | ... |

| MODEL CODE | CONTROL SCREEN INFORMATION |
|---|---|
| TV11 | ... |
| AD22 | ... |
| AC33 | ... |
| LT44 | ... |

FIG.16

| MODEL CODE | FORM INFORMATION | DEVICE ID | FEATURE INFORMATION |
|---|---|---|---|
| TV11 | ... | 111111 | ... |
| | | | ... |
| AD22 | ... | 222222 | ... |
| AC33 | ... | 333333 | ... |
| LT44 | ... | 444444-1 | ... |
| | | 444444-2 | ... |
| | | | ... |
| | | 444444-3 | ... |

24f

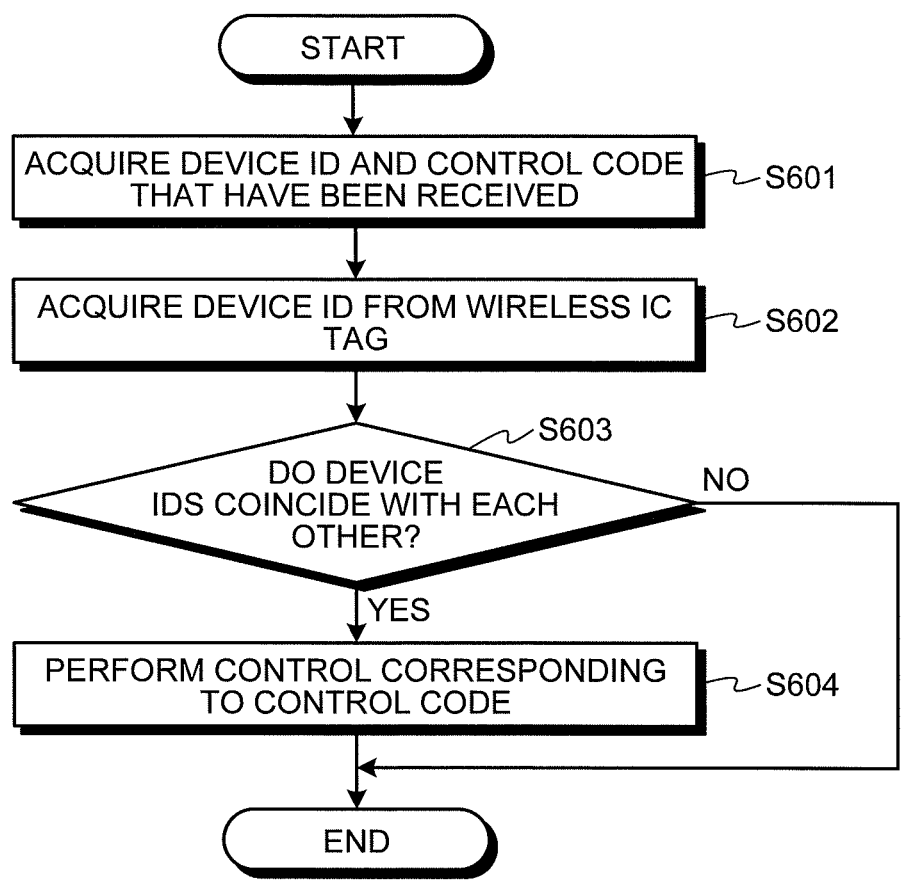

REMOTE CONTROL DEVICE, REMOTE CONTROL SYSTEM, AND STORAGE MEDIUM STORING CONTROL PROGRAM, AND MEDIUM TO BE ATTACHED TO ELECTRICAL DEVICE

CROSS-REFERENCE TO RELATED APPLICATIONS

This application claims priority from Japanese Application No. 2011-119689, filed on May 27, 2011, the content of which is incorporated by reference herein in its entirety.

BACKGROUND

1. Technical Field

The present disclosure relates to a remote control device, a remote control system, a storage medium storing therein a control program, and a medium to be attached to an electrical device.

2. Description of the Related Art

Some remote control devices support the remote control of a plurality of electrical devices. For example, a mobile phone disclosed in Japanese Patent Application Laid-Open (JP-A) No. 2001-237925 acquires specification data used for remote control of the electrical devices through data communication means to serve as a remote control device that supports the remote control of a plurality of electrical devices.

However, in a case where the mobile phone disclosed in JP-A No. 2001-237925 is used, a user needs to select the maker or the product classification of an electrical device on a screen so as to acquire the specification data that is used for the remote control of the electrical device. Such a screen operation may be troublesome for him/her, and it may be difficult for him/her to use the mobile phone if he/she is not accustomed to the operation of an information processing device.

For the foregoing reasons, there is a need for a remote control device, a remote control system, a storage medium storing therein a control program, and a medium to be attached to an electrical device that allow the user to control electrical devices easily.

SUMMARY

According to an aspect, a remote control device includes a display unit, an operation detecting unit, a reading unit, a control unit, and a code transmitting unit. The operation detecting unit detects an operation. The reading unit reads information used for remotely controlling an electrical device from the electrical device. The control unit causes the display unit to display a control screen used for remotely controlling the electrical device based on the information read by the reading unit. The code transmitting unit transmits a control code acquired based on the information read by the reading unit to the electrical device in response to an operation detected by the operation detecting unit while the control screen is displayed on the display unit.

According to another aspect, a remote control system includes an electrical device and a remote control device. The electrical device includes: a medium for maintaining information used for remote control; a receiving unit for receiving a control code; and a control unit for performing an operation corresponding to the control code received by the receiving unit. The remote control device includes: a display unit; an operation detecting unit for detecting an operation; a reading unit for reading information used for remotely controlling the electrical device from the electrical device; a control unit for causing the display unit to display a control screen used for remotely controlling the electrical device based on the information read by the reading unit, and a code transmitting unit for transmitting a control code acquired based on the information read by the reading unit to the electrical device in response to an operation detected by the operation detecting unit while the control screen is displayed on the display unit.

According to another aspect, a remote control system includes: an electrical device to which a medium is attached; a remote control device; for remotely controlling the electrical device; and a server for storing a control code used for remotely controlling the electrical device. The remote control device includes: a reading unit for reading identification information of the electrical device from the medium; a communication unit for acquiring the control code from the server based on the identification information; and a code transmitting unit for transmitting the control code to the electrical device.

According to another aspect, a non-transitory storage medium stores a control program. When executed by a remote control device, the control program causes the remote control device to execute: reading information used for remotely controlling an electrical device from the electrical device; acquiring a control code used for controlling the electrical device based on the read information; displaying a control screen used for remotely controlling the electrical device on a display unit based on the read information; and transmitting the control code to the electrical device in response to a detected operation while the control screen is displayed on the display unit.

According to another aspect, a medium to be attached to an electrical device includes: a storage unit for storing a control code used for remotely controlling the electrical device; and an antenna through which the control code is transmitted.

BRIEF DESCRIPTION OF THE DRAWINGS

FIG. 5 is a diagram illustrating an example of device identification data;

FIG. 6 is a diagram illustrating an example of control code data;

FIG. 16 is a diagram illustrating an example of device identification data;

FIG. 20 is a flowchart illustrating the processing sequence of an illumination device at the time of remote control.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the remote control device; however, the present invention is not limited to mobile phones. Therefore, the present invention can be applied to various information processing devices, including but not limited to personal handyphone systems (PHS), personal digital assistants (PDA), portable navigation units, personal computers (including but not limited to tablet computers, netbooks etc.), media players, portable electronic reading devices, and gaming devices. The present invention can also be applied to stationary electronic devices that have a plurality of display units.

Figure 1:
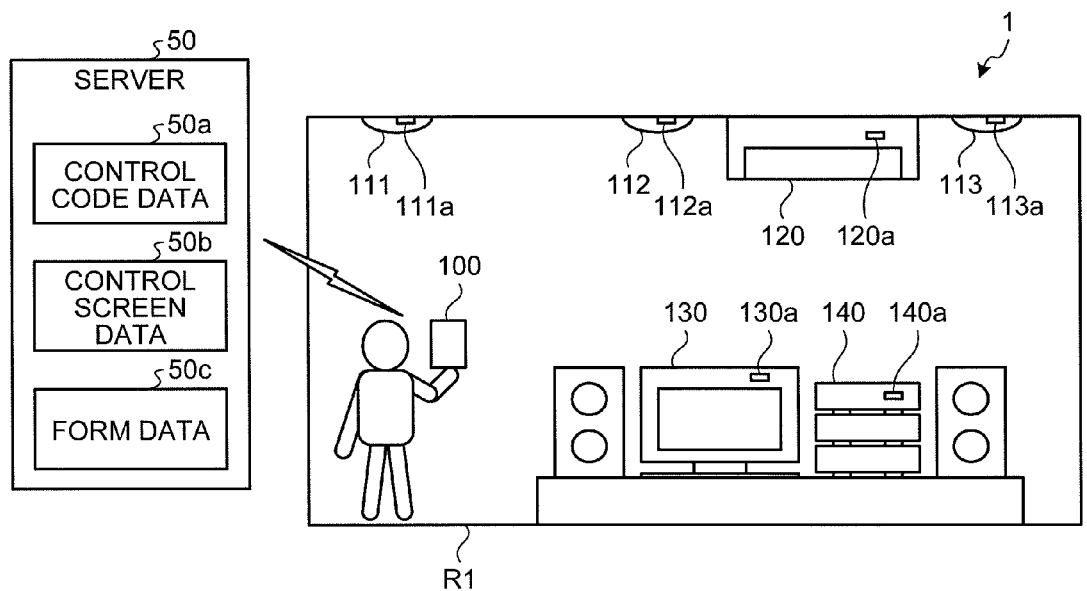
FIG. 1 is a diagram illustrating an example of a configuration of a remote control system according to a first embodiment.

First of all, a configuration of a remote control system 1 according to a first embodiment will be described with reference to FIG. 1. FIG. 1 is a diagram illustrating an example of the configuration of the remote control system 1. The remote control system 1 illustrated in FIG. 1 includes a mobile phone 100, illumination devices 111 to 113, an air conditioner 120, a television set 130, audio equipment 140, and a server 50.

The mobile phone 100 performs a voice call or data communication with an information processing device such as the server 50 through a communication path that is connected through a base station or the like. The mobile phone 100 serves as a remote control device that is used for remotely controlling electrical devices such as the illumination device 111 and the like.

The illumination devices 111 to 113, the air conditioner 120, the television set 130, and the audio equipment 140 that are installed inside a living room R1 are remotely controlled by the mobile phone 100. The illumination devices 111 to 113 perform turning power on/off, changing the brightness, and the like in accordance with remote control performed by the mobile phone 100. The air conditioner 120 performs turning power on/off, changing a set temperature, changing an air volume, and the like in accordance with remote control performed by the mobile phone 100. The television set 130 performs turning power on/off, switching between channels, changing a sound volume, and the like in accordance with remote control performed by the mobile phone 100. The audio equipment 140 performs turning power on/off, switching between sound sources, changing a sound volume, and the like in accordance with remote control performed by the mobile phone 100.

Tags 111a to 113a are attached to the illumination devices 111 to 113, respectively. A tag 120a is attached to the air conditioner 120. A tag 130a is attached to the television set 130. A tag 140a is attached to the audio equipment 140. The tags attached to such electrical devices are a kind of media on which bar codes, which are acquired by encoding identification information of corresponding electrical devices or information used for acquiring the identification information, is printed or added. The barcode may be a one-dimensional code or a two-dimensional code.

The server 50 stores control code data 50a, control screen data 50b, and form data 50c. The control code data 50a is data in which a control code is registered. The control code is a code that is transmitted from a remote control device to an electrical device so as to remotely control the function of the electrical device, and is defined in advance for each function of the electrical device as a remote control target. The control screen data 50b is data in which control screen information is registered. The control screen is a screen that receives an operation for controlling an electrical device, and the control screen information includes various definitions used for realizing the control screen such as the arrangement of buttons and correspondence between the buttons and the control codes. The form data 50c is data in which form information is registered. The form information includes information representing the features of an electrical device in the appearance such as a shape and a color.

In response to an inquiry from the mobile phone 100, the server 50 provides the mobile phone 100 with information used for remotely controlling an electrical device that has been inquired of. The information used for remotely controlling an electrical device includes a control code, control screen information, and form information.

The mobile phone 100 supports the remote control of an arbitrary electrical device by being supplied with information from the server 50. More specifically, the mobile phone 100 acquires identification information of the electrical device by photographing an image of the electrical device and decoding the barcode of the tag included in the photographed image. Then, the mobile phone 100 transmits the acquired identification information to the server 50 and receives information used for remotely controlling the electrical device corresponding to the identification information from the server 50 as a response.

As above, the mobile phone 100 acquires information used for remotely controlling the electrical device based on the photographed image. Accordingly, a user can allow the mobile phone 100 to support the remote control of an arbitrary electrical device by photographing the electrical device desired to be remotely controlled by using the mobile phone 100 without performing a complicated operation of inputting the model number of the electrical device and the like.

After being supplied with the information from the server 50, the mobile phone 100 identifies the electrical device that is currently photographed based on the image acquired at the time of acquiring the identification information or the form information acquired from the server 50, and displays a control screen corresponding to the identified electrical device.

Accordingly, even in a case where the mobile phone 100 is allowed to support the remote control of a plurality of electrical devices, the user can easily select an electrical device to be remotely controlled by photographing the electrical device desired to be remotely controlled by using the mobile phone 100.

The configuration of the remote control system 1 illustrated in FIG. 1 is an example, and the type and the number of electrical devices to be remotely controlled are not limited thereto. For example, the mobile phone 100 may be configured to remotely control a camera, a recording device, a PC, cooking appliances, a refrigerator, a washing machine, an outdoor illumination device, car locking, and the like. The server 50, for example, may be prepared for each maker or each model of electrical devices.

Figure 2:
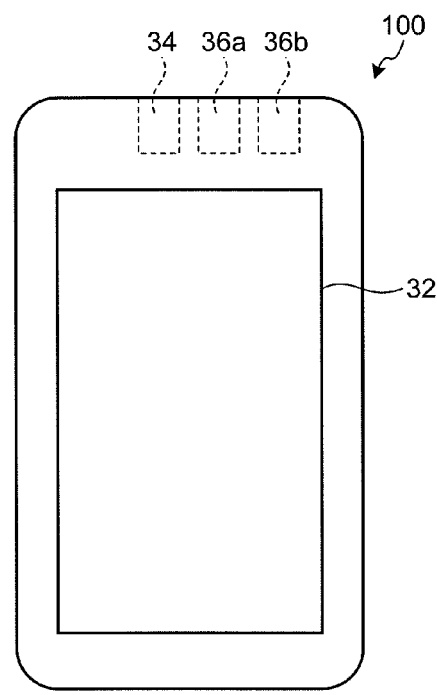
FIG. 2 is a front view of a mobile phone according to the first embodiment.
Figure 3:
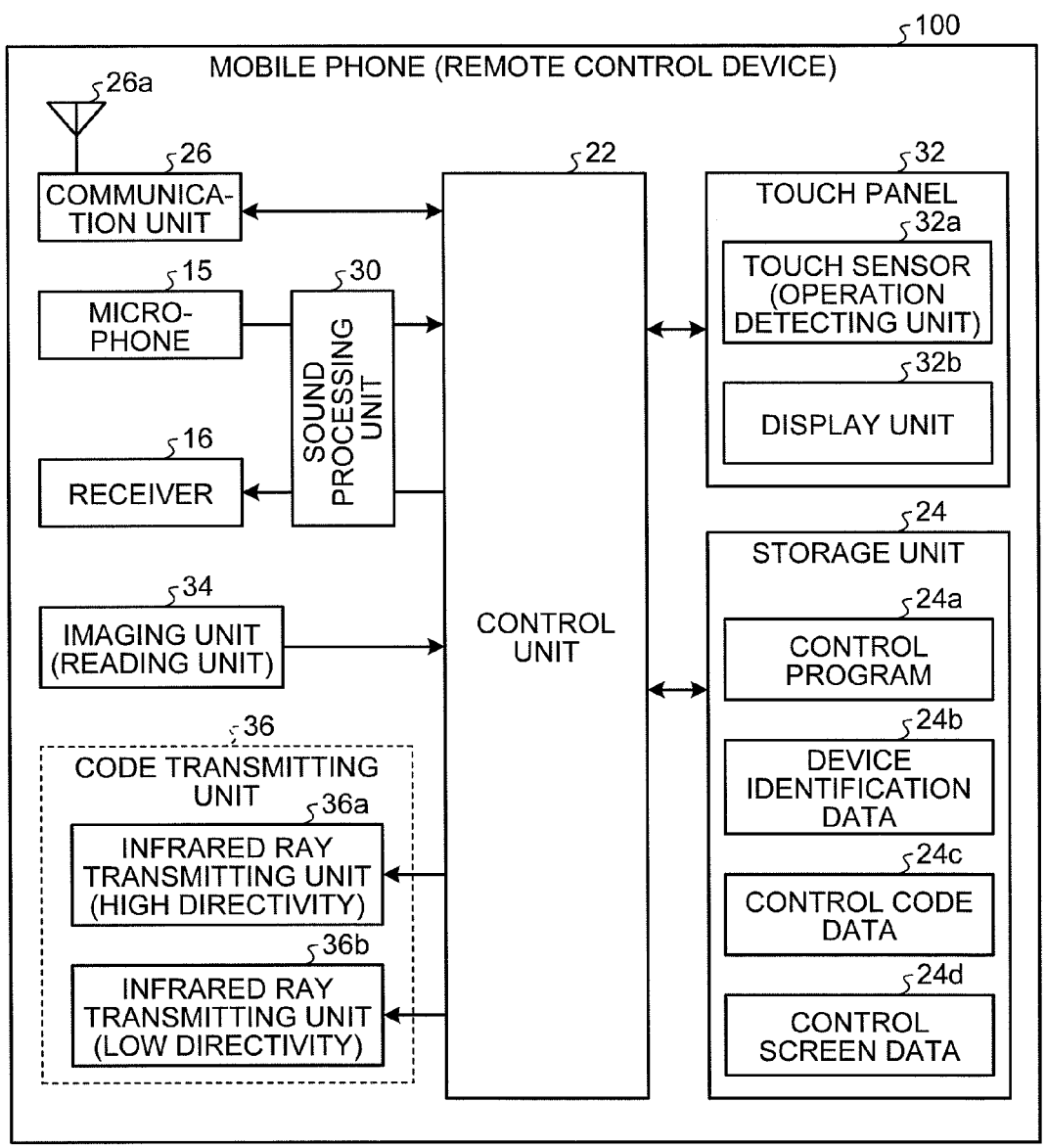
FIG. 3 is a block diagram of the mobile phone according to the first embodiment.

Then, the configuration of the mobile phone 100 illustrated in FIG. 1 will be described with reference to FIGS. 2 and 3. FIG. 2 is a front view of the mobile phone 100. FIG. 3 is a block diagram of the mobile phone 100. As illustrated in FIGS. 2 and 3, the mobile phone 100 includes a communication unit 26, a sound processing unit 30, a touch panel 32, an imaging unit 34, a code transmitting unit 36, a control unit 22, and a storage unit 24.

The communication unit 26 includes an antenna 26a and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26. The sound processing unit 30 generates a digital signal based on a sound input from a microphone 15 and outputs the digital signal to the control unit 22. The sound processing unit 30 decodes the digital signal output from the control unit 22 and outputs the decoded signal to a receiver 16.

The touch panel 32 displays a text, a diagram, an image, and the like, and detects various operations performed for the touch panel 32 using a finger, a stylus, a pen, or the like (in the description herein below, for the sake of simplicity, it is assumed that the user touches the touch panel 32 with his/her finger(s)). The touch panel 32 includes a display unit 32b and a touch sensor (operation detecting unit) 32a overlapping the display unit 32b.

The touch sensor 32a detects various operations performed for the touch panel 32 using finger(s) as well as the positions of places on the touch panel 32 in which the operations are performed. The type of the touch sensor 32a for detecting various operations may be an arbitrary type such as a capacitive type, a resistive type, or a pressure-sensitive type. The operations detected by the touch sensor 32a include a tap operation, a double-tap operation, a long tap operation, a sweeping (swipe) operation, a flick operation, and the like.

The tap operation is an operation of bringing a finger into contact with the touch panel 32 and then immediately separating the finger from the touch panel 32. The double-tap operation is an operation of repeating an operation of bringing a finger into contact with the touch panel 32 and then immediately separating the finger from the touch panel 32 twice. The long tap operation is an operation of bringing a finger into contact with the touch panel 32 and separating the finger from the touch panel 32 after a state is maintained for a predetermined time in which the finger is brought into contact with the touch panel 32. The sweeping operation is an operation of moving a finger while the finger is brought into contact with the touch panel 32. The sweeping operation is called a drag operation in a case where an object displayed on the touch panel 32 is moved in accordance with the operation. The flick operation is an operation of bringing a finger into contact with the touch panel 32 and then moving the finger at a high speed in one direction as in a case of quickly sweeping something.

The display unit 32b displays a text, a figure, an image, and the like on a display device such as a LCD (liquid crystal display) or an GELD (organic electro-luminescence display). The display unit 32b displays various types of information in accordance with a control signal that is input from the control unit 22.

The imaging unit 34 electronically photographs an image by using an image sensor such as a charge coupled device (CCD) and a complementary metal oxide semiconductor (COMS). The imaging unit 34 outputs the photographed image to the control unit 22 as image signals. The imaging unit 34 also serves as a reading unit that is used for reading the barcode of a tag attached to an electrical device.

Figure 4:
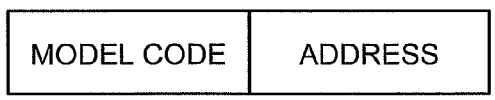
FIG. 4 is a diagram illustrating an example of information that is read out from a barcode.

In the barcode read by the imaging unit 34 from the tag attached to an electrical device, as illustrated in FIG. 4, a model code and an address are included. The model code is a kind of identification information and is used for identifying the type of the electrical device. Electrical devices having the same model code are remotely controlled by using the same control code. The address is used for performing data communication with the server 50. Instead of acquiring the address from a barcode, a known address that is stored in the storage unit 24 in advance may be used.

The code transmitting unit 36 transmits a control code in accordance with the control signal that is input from the control unit 22. The code transmitting unit 36 includes an infrared ray transmitting unit 36a and an infrared ray transmitting unit 36b. The infrared ray transmitting unit 36a and the infrared ray transmitting unit 36b transmit control codes by controlling the blinking patterns of infrared rays to be emitted. The infrared ray transmitting unit 36a has high directivity and thus transmits a control code in a relatively narrow range. The infrared ray transmitting unit 36b has low directivity and thus transmits a control code in a relatively wide range. The code transmitting unit 36 selects one of the infrared ray transmitting unit 36a and the infrared ray transmitting unit 36b and causes the selected infrared ray transmitting unit to transmit a control code.

As illustrated in FIG. 2, the imaging unit 34, the infrared ray transmitting unit 36a, and the infrared ray transmitting unit 36b are disposed in the upper portion of the mobile phone 100, and the light incidence portion of the imaging unit 34 and light outgoing portions of the infrared ray transmitting units 36a and 36b face the same face. In other words, the imaging unit 34, the infrared ray transmitting unit 36a, and the infrared ray transmitting unit 36b are arranged such that the infrared ray transmitting unit 36a and the infrared ray transmitting unit 36b can emit infrared rays to an object that is photographed by the imaging unit 34. The arrangement of the imaging unit 34, the infrared ray transmitting unit 36a, and the infrared ray transmitting unit 36b are not limited thereto, and the photographing direction and the emission direction of the infrared rays have only to approximately coincide with each other.

The control unit 22 includes a CPU (central processing unit) as a calculating unit and memory as a storing unit, and realizes various functions by executing programs using such hardware resources. More specifically, the control unit 22 reads out a program and data stored in the storage unit 24 so as to be loaded on the memory and allows the CPU to execute commands included in the program expanded in the memory.

Then, the control unit 22, in accordance with the result of execution of commands through the CPU, performs data reading or data writing for the memory and the storage unit 24 or controls the operations of the communication unit 26, the touch panel 32, the imaging unit 34, the code transmitting unit 36, and the like. When the CPU executes the commands, data loaded on the memory, a signal input from the touch panel 32, or the like is used as a parameter.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores a variety of programs and data. The programs and the data that are stored in the storage unit 24 include a control program 24a, device identification data 24b, control code data 24c, and control screen data 24d. The storage unit 24 may be configured by a combination of a portable storage medium such as a memory card or an optical disc and a read/write device that reads and writes data from/into the storage medium. In such a case, the programs and the data to be stored in the storage unit 24 may be stored in the portable storage medium. The programs and the data to be stored in the storage unit 24 may be acquired from another device such as a server through communication using the communication unit 26.

The control program 24a provides functions for controlling each unit of the mobile phone 100. The functions provided by the control program 24a include a function of operating the mobile phone 100 as a remote control device. The function of operating the mobile phone 100 as a remote control device will be described later in detail.

The device identification data 24b is used for identifying an electrical device that is included in the image photographed by the imaging unit 34. An example of the device identification data 24b is illustrated in FIG. 5. As illustrated in FIG. 5, in the device identification data 24b, the form information and the feature information are registered in association with a model code. The model code is identification information used for identifying the type of an electrical device. In an example illustrated in FIG. 5, "TV11" is identification information that is used for identifying a type of the television set 130. "AD22" is identification information that is used for identifying a type of the audio equipment 140. "AC33" is identification information that is used for identifying a type of the air conditioner 120. "LT44" is identification information that is used for identifying a type of the illumination devices 111 to 113.

The form information includes information that represents the features of an electrical device in the appearance such as a shape and a color. The form information is acquired from the server 50. The feature information includes information that represents the features of an electrical device and the vicinity thereof, on which the electrical device is installed, in the appearance such as shapes and colors. The feature information is generated based on an image photographed by the imaging unit 34 at the time of reading a barcode from the tag attached to the electrical device. The feature information may be an image itself photographed by the imaging unit 34 at the time of reading a barcode from the tag attached to the electrical device.

The control code data 24c maintains a control code that is used for remotely controlling an electrical device. An example of the control code data 24c is illustrated in FIG. 6. As illustrated in FIG. 6, in the control code data 24c, a control code is registered for each model code and each function. The control code is acquired from the server 50.

Figures 7, 8:
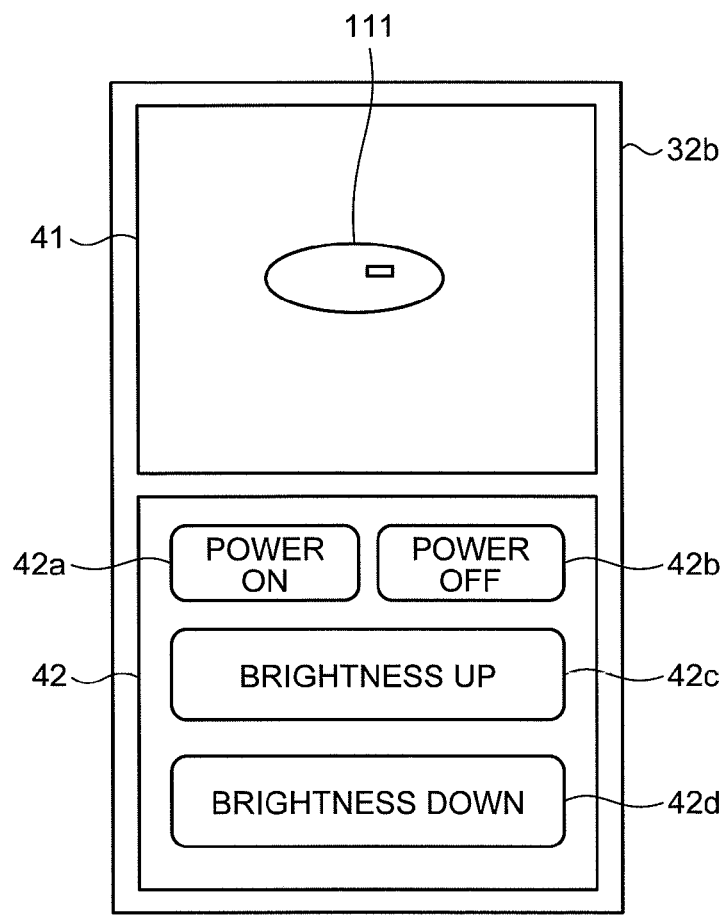
FIG. 7 is a diagram illustrating an example of control screen data.
FIG. 8 is a diagram illustrating an example of a control screen displayed based on control screen information.

The control screen data 24d maintains control screen information that defines a control screen used for remotely controlling an electrical device. An example of the control screen data 24d is illustrated in FIG. 7. As illustrated in FIG. 7, in the control screen data 24d, control screen information is registered in association with the model code. The control screen information is acquired from the server 50.

An example of the control screen that is displayed based on the control screen information is illustrated in FIG. 8. The control screen illustrated in FIG. 8 includes an image display area 41 that occupies the upper half of the display unit 32b and an operation area 42 that occupies the lower half of the display unit 32b. In the image display area 41, an image photographed by the imaging unit 34 is displayed. In the operation area 42, buttons, a message, and the like that are used for remotely controlling the electrical device included in the image photographed by the imaging unit 34 are displayed.

The content displayed in the operation area 42 is dynamically changed in accordance with the image photographed by the imaging unit 34. In the example illustrated in FIG. 8, the illumination device 111 is included in the image photographed by the imaging unit 34. Accordingly, in the operation area 42, a power-on button 42a, a power-off button 42b, a brightness-up button 42c, and a brightness-down button 42d are displayed based on the control screen information that is registered in the control screen data 24d in association with the model code of the illumination device 111.

In the control screen information, an operation for a case where an operation for an item displayed in the operation area 42 is detected is also defined. For example, in a case where a tap operation for the power-on button 42a is detected by the touch sensor 32a, the control unit 22 acquires a control code used for turning on the power of the illumination device 111 from the control code data 24c based on the definition of the control screen information and transmits the control code from the code transmitting unit 36. As described above, since the photographing direction of the imaging unit 34 and the transmission direction of the code transmitting unit 36 approximately coincide with each other, the transmitted control code is transmitted toward the illumination device 111 that is displayed in the image display area 41.

Figure 9:
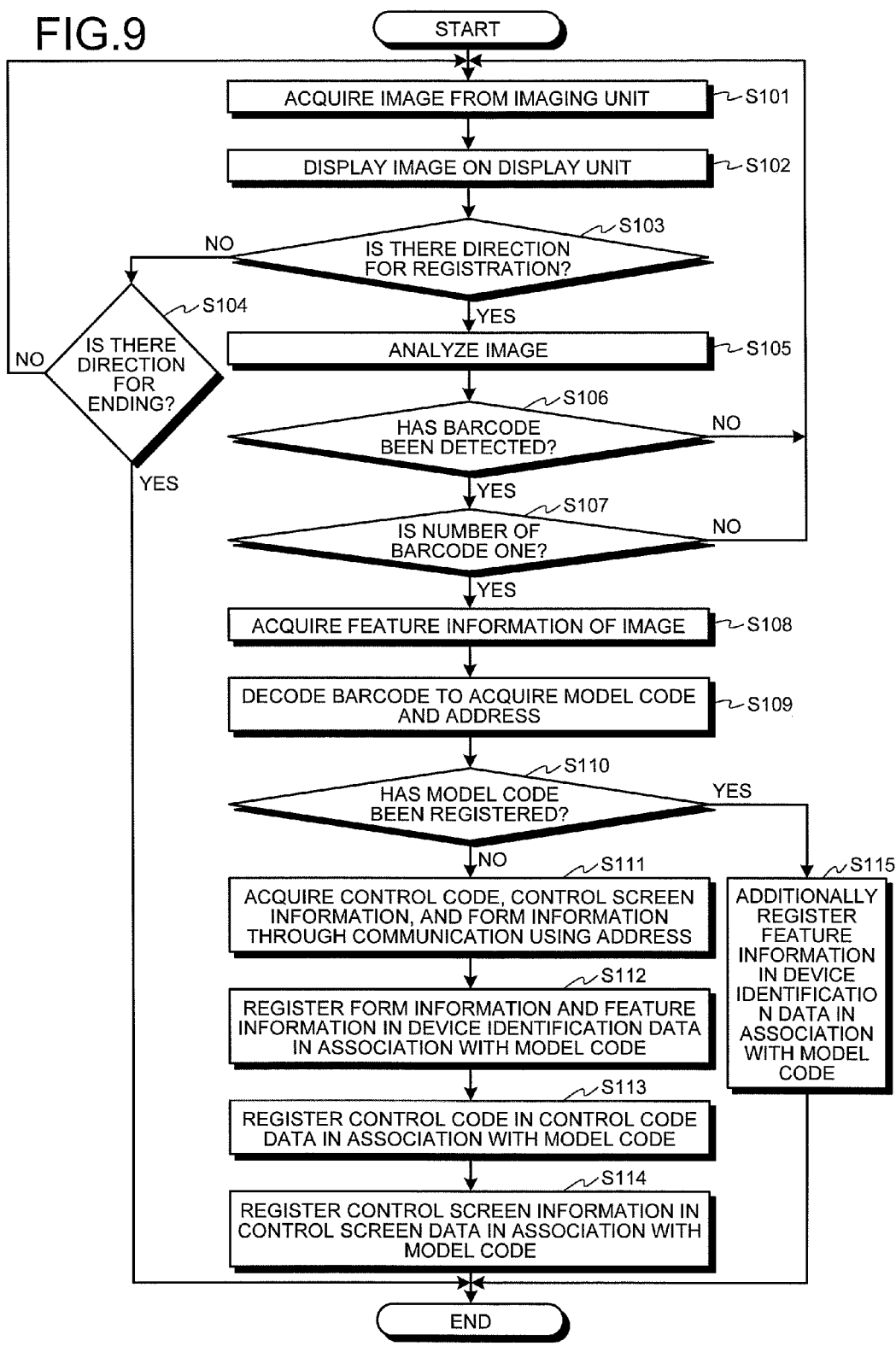
FIG. 9 is a flowchart illustrating a processing sequence of the mobile phone at the time of registering information used for remotely controlling an electrical device.

Then, the operation of the mobile phone 100 relating to the remote control of an electrical device will be described with reference to FIGS. 9 and 10. FIG. 9 is a flowchart illustrating the processing sequence of the mobile phone 100 at the time of registering information used for remotely controlling an electrical device. The processing sequence illustrated in FIG. 9 is triggered by the detection of a predetermined operation directing the start of a registration process using the touch sensor 32a and is performed based on the control program 24a.

As illustrated in FIG. 9, the control unit 22 acquires an image from the imaging unit 34 at Step S101 and displays the image on the display unit 32b at Step S102. At this time, the control unit 22 performs display of a message and the like for the display unit 32b together with the image, so as to urge a user to perform a predetermined operation for directing the registration of information when an electrical device as a registration processing target is included in the image. Then, the control unit 22 determines whether a predetermined operation directing the registration of information has been detected, at Step S103.

When the predetermined operation directing the registration has not been detected (No in Step S103), the control unit 22 determines whether a predetermined operation directing the end of the process has been detected, at Step S104. When the predetermined operation directing the end of the process has been detected (Yes in Step S104), the control unit 22 ends the process. When the predetermined operation directing the end of the process has not been detected (No in Step S104), the control unit 22 re-performs Step S101 and the subsequent steps.

When the predetermined operation directing the registration has been detected (Yes in Step S103), the control unit 22 analyzes the image acquired from the imaging unit 34, at Step S105. Then, the control unit 22 determines whether a barcode has been detected inside the image through the analysis of the image at Step S106. When the barcode has not been detected (No in Step S106), the control unit 22 re-performs Step S101 and the subsequent steps.

When a barcode has been detected (Yes in Step S106), the control unit 22 determines whether the number of detected barcodes is one, at Step S107. When the number of the detected barcodes is not one, in other words, when an electrical device as a registration target can not be specified (No in Step S107), the control unit 22 re-performs Step S101 and the subsequent steps.

When the number of the detected barcodes is one (Yes in Step S107), the control unit 22 acquires the feature information of the image acquired from the imaging unit 34, at Step S108. The control unit 22 decodes the detected barcode to acquire a model code and an address, at Step S109. Then, the control unit 22 determines whether the acquired model code is registered in the device identification data 24b, at Step S110.

When the model code is not registered, in other words, when the model code is a code to be registered newly (No in Step S110), the control unit 22 acquires a control code, control screen information, and form information of the type corresponding to the model code through a communication using the address, at Step S111.

The communication using an address, for example, is a communication of acquiring information from the server 50 through a hypertext transfer protocol (HTTP) by using the address as a uniform resource locator (URL). In such a case, the model code is attached to a request to be transmitted to the server 50 as a part of the URL or common gateway interface (CGI) parameters. The communication using an address may be a communication in which an electronic mail is transmitted to the server 50 by using the address as a destination mail address, and an electronic mail replied from the server 50 by adding information is received. In such a case, the model code is added to an electronic mail to be transmitted to the server 50 as a part of the header or the body.

Subsequently, the control unit 22 registers the acquired form information and the acquired feature information in the device identification data 24b in association with the model code, at Step S112. The control unit 22 registers the acquired control code in the control code data 24c in association with the model code at Step S113, and registers the acquired control screen information in the control screen data 24d in association with the model code at Step S114.

When the model code is registered (Yes in Step S110), the control unit 22 additionally registers the acquired feature information in the device identification data 24b in association with the model code that has been registered, at Step S115. By additionally registering the feature information as above, the feature information of a plurality of images acquired by photographing an electrical device at various angles can be associated with one model code. As a result, the precision of the detection of an electrical device included in the image, which is performed based on the device identification data 24b, is improved.

Figure 10:
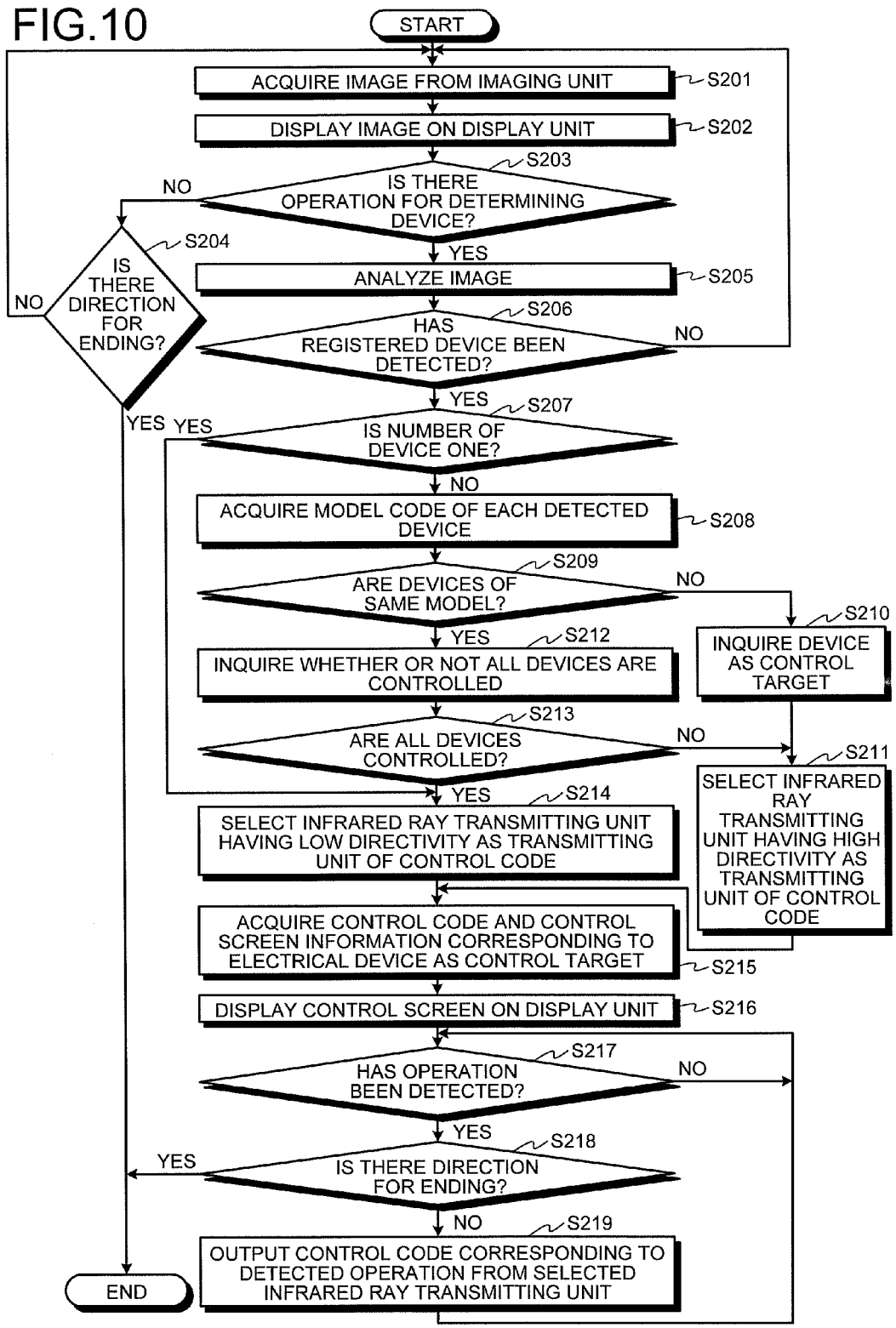
FIG. 10 is a flowchart illustrating the processing sequence of the mobile phone in a case where an electrical device is remotely controlled.

FIG. 10 is a flowchart illustrating the processing sequence of the mobile phone 100 in a case where an electrical device is remotely controlled. The processing sequence illustrated in FIG. 10 is triggered by the detection of a predetermined operation directing the start of remote control of an electrical device by using the touch sensor 32a and is performed based on the control program 24a.

As illustrated in FIG. 10, the control unit 22 acquires an image from the imaging unit 34 at Step S201, and displays the image on the display unit 32b at Step S202. At this time, the control unit 22, for example, displays the image in the image display area 41 of the control screen, and inquires a user whether an electrical device that is currently displayed is determined as a control target in the operation area 42. By requesting the determination of an electrical device as a control target while displaying the image as above, the user can select the electrical device as the control target easily and assuredly.

Subsequently, the control unit 22 determines whether the predetermined operation determining the electrical device as the control target has been detected at Step S203. When the predetermined operation determining the electrical device as the control target has not been detected (No in Step S203), the control unit 22 determines whether a predetermined operation directing the end of the process has been detected, at Step S204. When the predetermined operation directing the end of the process has been detected (Yes in Step S204), the control unit 22 ends the process. When the predetermined operation directing the end of the process has not been detected (No in Step S204), the control unit 22 re-performs Step S201 and the subsequent steps.

When the predetermined operation determining the electrical device as the control target has been detected (Yes in Step S203), the control unit 22 tries to detect an electrical device included in the image by analyzing the image acquired from the imaging unit 34, at Step S205. The detection of an electrical device is realized by comparing the image with the form information and the feature information, which are registered in the device identification data 24b. Accordingly, only the electrical devices of which information is registered in the device identification data 24b are detected at Step S205.

Subsequently, the control unit 22 determines whether an electrical device that has been registered is detected within the image through an analysis of the image, at Step S206. When an electrical device has not been detected (No in Step S206), the control unit 22 re-performs Step S201 and the subsequent steps.

When an electrical device has been detected (Yes in Step S206), the control unit 22 determines whether the number of the detected electrical devices is one, at Step S207. When the number of the detected electrical devices is one, in other words, when the electrical device as the control target is specified (Yes in Step S207), the control unit 22 selects the infrared ray transmitting unit 36b having low directivity as a transmitting unit of the control code, at Step S214. By selecting the infrared ray transmitting unit 36b having low directivity as the transmitting unit, the user can allow the electrical device as the control target to be easily included in the transmission range of the control code.

Subsequently, the control unit 22 acquires a control code corresponding to the electrical device as the control target from the control code data 24c and acquires the control screen information corresponding to the electrical device as the control target from the control screen data 24d, at Step S215.

Then, the control unit 22 displays the control screen used for the electrical device as the control target in the display unit 32b based on the acquired control screen information, at Step S216.

Subsequently, the control unit 22 determines whether an operation for the control screen has been detected, at Step S217. When an operation has not been detected (No in Step S217), the determination performed in Step S217 is performed again. When an operation has been detected (Yes in Step S217), the control unit 22 detects whether the detected operation is a predetermined operation directing the end of the process, at Step S218. When the detected operation is the predetermined operation directing the end of the process (Yes in Step S218), the control unit 22 ends the process.

When the detected operation is not the predetermined operation directing the end of the process (No in Step S218), the control unit 22 outputs a control code corresponding to the detected operation from a selected infrared ray transmitting unit, at Step S219. Thereafter, the control unit 22 re-performs Step S217 and the subsequent steps.

When the number of electrical devices detected from the image is not one but two or more (No in Step S207), the control unit 22 acquires model codes of the detected electrical devices from the device identification data 24b, at Step S208. Then, the control unit 22 compares the acquired model codes with each other and determines whether the detected electrical devices are of the same model based on the result of the comparison, at Step S209.

When the detected electrical devices are not of the same model (No in Step S209), the control unit 22 inquires the user of an electrical device that is the control target and determines the electrical device selected by the user as the control target, at Step S210. The inquiry for the user is realized, for example, by displaying a predetermined screen on the display unit 32b. Then, the control unit 22 selects the infrared ray transmitting unit 36a having high directivity as the transmitting unit of the control code, at Step S211.

The detection of a plurality of electrical devices from an image represents that there is another device near the electrical device as the control target, and there is a possibility of causing malfunction of another electrical device through the transmission of a control code. By selecting the infrared ray transmitting unit 36a having high directivity as the transmitting unit, the transmission range of the control code is narrow, and the control code hardly arrives at an electrical device other than the control target. Thereafter, the control unit 22 performs Step S215 and the subsequent steps described above.

When the detected electrical devices are of the same model (Yes in Step S209), the control unit 22 inquires the user whether all the detected electrical devices are controlled, at Step S212. When the user selects to control all the detected electrical devices (Yes in Step S213), the control unit 22 selects the infrared ray transmitting unit 36b having low directivity as the transmitting unit of the control code, at Step S214. By selecting the infrared ray transmitting unit 36b having low directivity as the transmitting unit, the user can easily allow the plurality of electrical devices to be included in the transmission range of the control code.

On the other hand, when the user selects to control one electrical device (No in Step S213), the control unit 22 selects the infrared ray transmitting unit 36a having high directivity as the transmitting unit of the control code, at Step S211. By selecting the infrared ray transmitting unit 36a having high directivity as the transmitting unit, the transmission range of the control code is narrow, and the control code hardly arrives at an electrical device other than the control target. After the electrical device as the control target is determined as above, the control unit 22 performs Step S215 and the subsequent steps described above.

Figure 11:
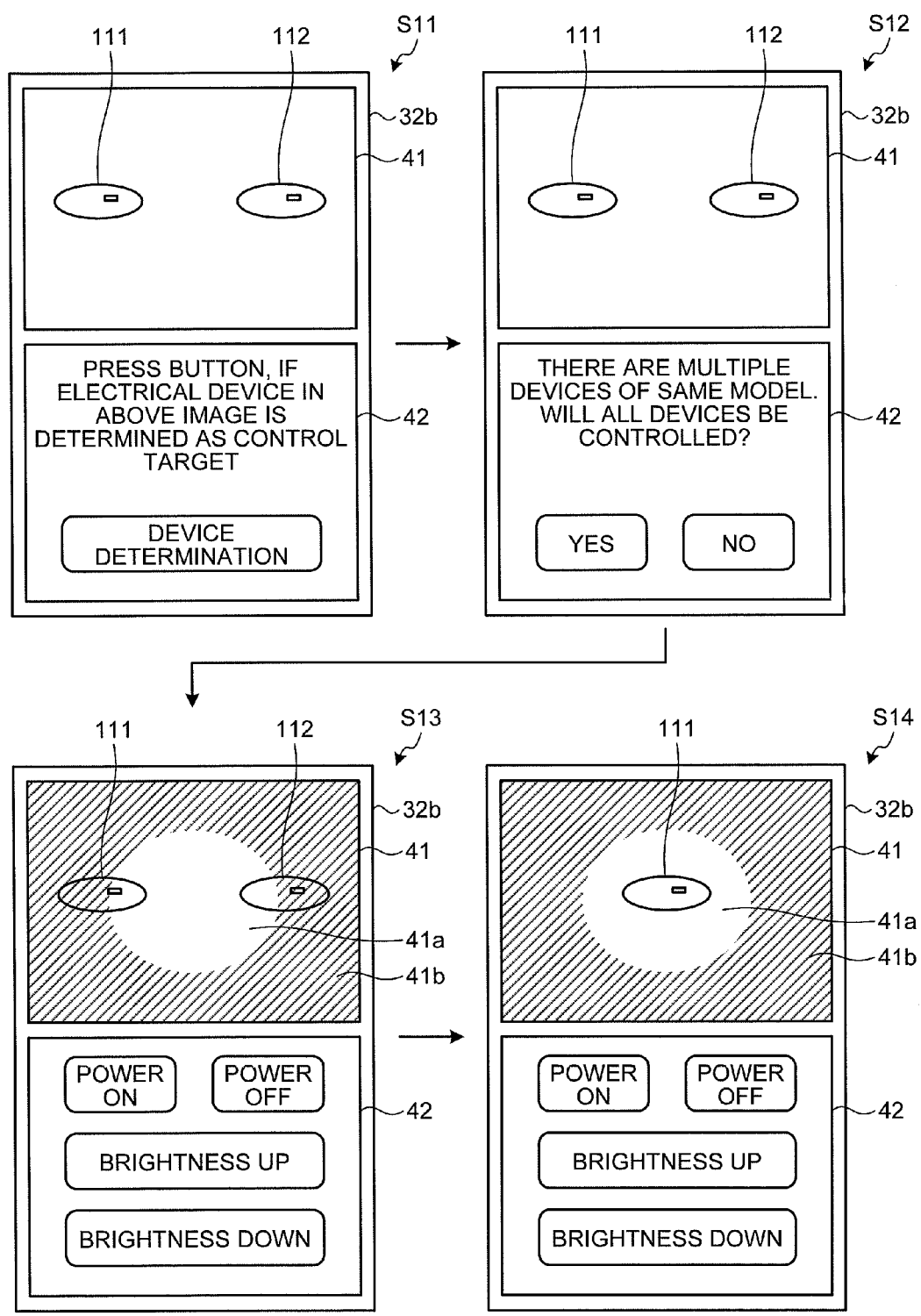
FIG. 11 is a diagram illustrating an example of screen control in a case where an infrared ray transmitting unit having high directivity is selected as a transmitting unit of a control code.

When the infrared ray transmitting unit 36a having high directivity is selected as the transmitting unit of the control code in the processing sequence illustrated in FIG. 10, the control unit 22 may change the display of the operation screen such that the user can easily transmit the control code toward the electrical device as the control target. FIG. 11 is a diagram illustrating an example of screen control in a case where the infrared ray transmitting unit 36a having high directivity is selected as the transmitting unit of the control code.

Step S11 illustrated in FIG. 11 represents an example of the screen displayed at a scene of Step S202 illustrated in FIG. 10, that is, a scene used for determining an electrical device as a target of remote control. In this example, in Step S11, the image photographed by the imaging unit 34 is displayed in the image display area 41. In the image, the illumination devices 111 and 112 are included. In the operation area 42, a screen used for inquiring the user whether the electrical device that is currently displayed is determined as the control target is displayed.

When the predetermined operation used for determining the electrical devices as control targets is detected, a plurality of electrical devices of the same model is included in the image; therefore, the control unit 22, as illustrated in Step S12, inquires the user whether all the electrical devices included in the image are controlled.

When the control of only one electrical device is selected by the user, the control unit 22, as illustrated in Step S13, changes the display mode of the image display area 41, in addition to displaying a control screen corresponding to the electrical device in the operation area 42. The change in the display mode of the image display area 41 is made such that an area 41a corresponding to the transmission range of the infrared ray transmitting unit 36a having high directivity and an area 41b other than the area 41a can be easily distinguished by the user.

In the example illustrated in FIG. 11, although the control unit 22 changes the display mode by lowering the brightness of the area 41b, the manner of changing the display mode is not limited thereto. For example, the control unit 22 may superpose a predetermined image on the area 41b or may draw a section line on the boundary between the area 41a and the area 41b. It is preferable that the degree of visibility of the area 41a is not decreased even after the display mode is changed. Furthermore, even after the display mode is changed, it is preferable that the image photographed by the imaging unit 34 can be recognized by the user in the area 41b. In addition, the size of the area 41a may be fixed to a size that is predetermined in advance, or may be changed in accordance with a distance up to an electrical device as the control target, which is measured by using a distance measuring function of the imaging unit 34 or the like.

By changing the display mode of the image display area 41 as above, the user can visually recognize that the directivity of the transmitting unit of the control code is increased, and can precisely transmit the control code toward the electrical device as the control target easily. For example, in a case where the illumination device 111 is the control target, as illustrated in Step S14, by changing the direction of the mobile phone 100 such that the illumination device 111 is included in the area 41a, the user can transmit the control code so as to arrive at the illumination device 111.

In FIG. 11, an example is illustrated in which a plurality of electrical devices of the same model is included in the image; however, even in a case where electrical devices of a plurality of models are included within the image, it is preferable that the screen control is similarly performed such that the user can precisely perform the remote control of one electrical device.

As described above, according to the first embodiment, the mobile phone 100 acquires the information used for remotely controlling the electrical device from the server 50 based on the identification information read from the electrical device by the mobile phone 100, and accordingly, the mobile phone 100 can be easily allowed to support the remote control of a plurality of electrical devices. In addition, the electrical device is identified based on the image photographed by the mobile phone 100, and accordingly, the user can easily select an electrical device as the control target.

Figure 12:
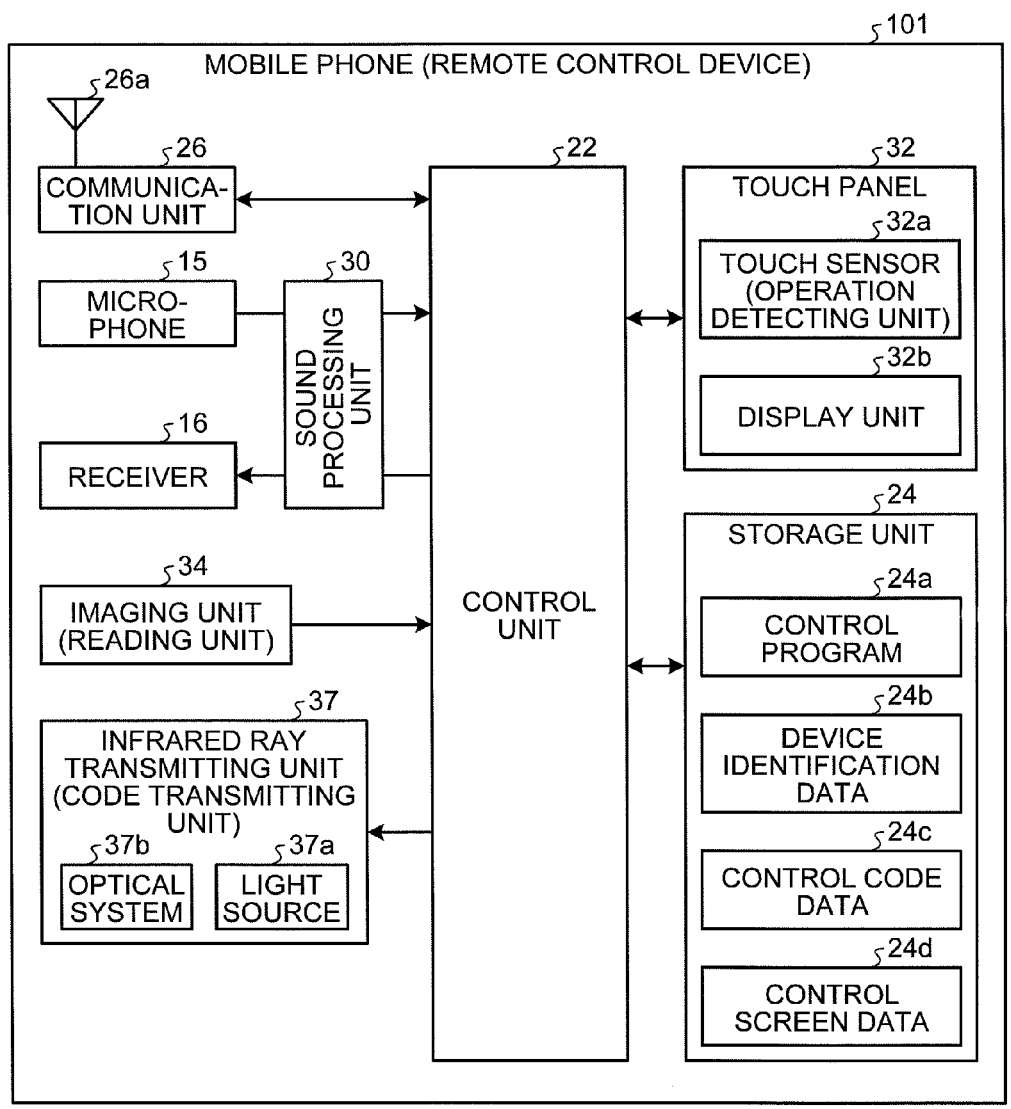
FIG. 12 is a block diagram illustrating a modification of the mobile phone according to a first embodiment.

In the above-described embodiment, the code transmitting unit includes two transmitting units having different directivities so as to change the directivity of the code transmitting unit; however, the code transmitting unit may include a single transmitting unit of which the directivity can be changed. For example, a code transmitting unit (infrared ray transmitting unit) 37, which is included in a mobile phone 101 illustrated in FIG. 12, includes a light source 37a and an optical system 37b. The light source 37a emits infrared rays. The optical system 37b changes the transmission range of infrared rays emitted by the light source 37a.

The optical system 37b may change the transmission range of infrared rays by changing a distance between a lens included in the optical system 37b and the light source 37a. The optical system 37b may change the transmission range of infrared rays by changing the angle of a mirror included in the optical system 37b. Alternatively, the code transmitting unit 37 may be a projection unit of a projector that is used in a presentation, projection of an image, or the like. The projection unit of the projector that is used as the code transmitting unit 37, for example, may employ a system in which an image is drawn by reflecting laser beams emitted from the light source 37a by using a micro electromechanical system (MEMS) mirror of the optical system 37b. The projection unit of the projector that is used as the code transmitting unit 37 may be configured by combining a light source 37a such as a halogen light, a light emitting diode (LED), or a laser diode (LD) and an optical system 37b that includes a LCD, a digital micro-mirror device (DMD), or the like.

In the above-described embodiment, the mobile phone 100 acquires the identification information of an electrical device from the barcode that is included in the image photographed by the imaging unit 34; however, the server 50 may acquire the identification information of the electrical device from the image. In such a case, the mobile phone 100 transmits an image photographed by the imaging unit 34 to the server 50, and the server 50 tries to detect a barcode that is included in the transmitted image. Then, in a case where one barcode is detected, the server 50 decodes the barcode and transmits the decoded model code, and a control code, the control screen information, and the form information corresponding to the model code to the mobile phone 100 as a reply. On the other hand, in a case where a barcode is not detected, or in a case where a plurality of barcodes is detected, the server 50 transmits corresponding error information to the mobile phone 100 as a reply.

The image itself may be used as the identification information of an electrical device. In such a case, the mobile phone 100 transmits the image photographed by the imaging unit 34 to the server 50, and the server 50 tries to specify the type of the electrical device that is included in the image by comparing the transmitted image with the form data 50c. Then, in a case where one type is specified, the server 50 transmits the model code of the type, and the control code, the control screen information, and the form information corresponding to the model code to the mobile phone 100 as a reply. On the other hand, in a case where the type is not specified, or in a case where a plurality of types is specified, the server 50 transmits corresponding error information to the mobile phone 100 as a reply.

In a case where the image itself is used as the identification information of an electrical device, the mobile phone 100 may transmit the image of the electrical device as the control target to the server 50 each time remote control is performed without performing the registration process as illustrated in FIG. 9. In such a case, the server 50 tries to specify the type of the electrical device that is included in the image by matching the transmitted image with the form data 50c. Then, in a case where one type is specified, the server 50 transmits the control code and the control screen information of the type to the mobile phone 100 as a reply, and the mobile phone 100 performs remote control by using the replied information. On the other hand, in a case where the type is not specified, or in a case where a plurality of types is specified, the server 50 transmits corresponding error information to the mobile phone 100 as a reply. By transmitting and receiving more detailed information between the mobile phone 100 and the server 50, in a case where a plurality of electrical devices is included in an image, the mobile phone 100 may decrease the transmission range of the control code.

In the above-described first embodiment, an example has been illustrated in which the information used for remotely controlling the electrical device is maintained by the server 50; however, the information used for remotely controlling an electrical device may be maintained by each electrical device. In the following second embodiment, an example will be described in which the information used for remotely controlling an electrical device is maintained by each electrical device. In the description presented below, the same reference numeral is assigned to the same portion as a portion that has been already described. In addition, in the description presented below, duplicate description of the portion that has been already described may not be repeated.

Figure 13:
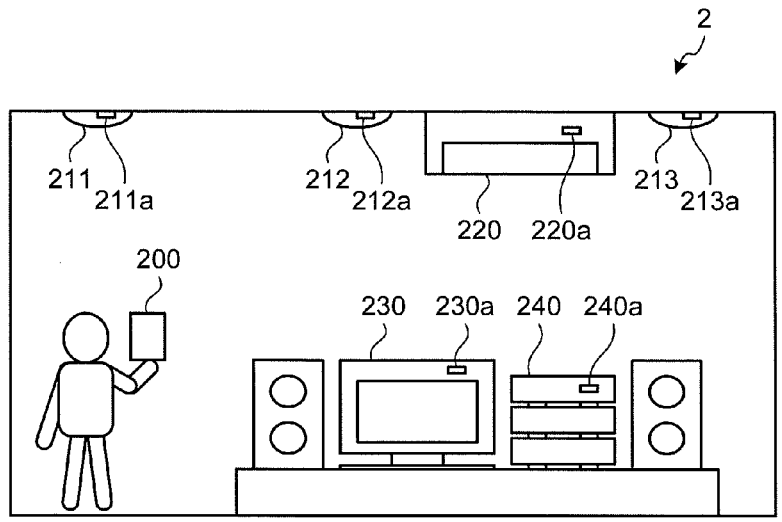
FIG. 13 is a diagram illustrating an example of a configuration of a remote control system according to a second embodiment.

First of all, a configuration of a remote control system 2 according to a second embodiment will be described with reference to FIG. 13. FIG. 13 is a diagram illustrating an example of the configuration of the remote control system 2. The remote control system 2 illustrated in FIG. 13 includes a mobile phone 200, illumination devices 211 to 213, an air conditioner 220, a television set 230, and audio equipment 240.

The illumination devices 211 to 213, the air conditioner 220, the television set 230, and the audio equipment 240 that are installed inside a living room are remotely controlled by the mobile phone 200. The illumination devices 211 to 213 perform turning power on/off, changing the brightness, and the like in accordance with remote control performed by the mobile phone 200. The air conditioner 220 performs turning power on/off, changing a set temperature, changing the air volume, and the like in accordance with remote control performed by the mobile phone 200. The television set 230 performs turning power on/off, switching between channels, changing the sound volume, and the like in accordance with remote control performed by the mobile phone 200. The audio equipment 240 performs turning power on/off, switching between sound sources, changing the sound volume, and the like in accordance with remote control performed by the mobile phone 200.

Wireless IC tags 211a to 213a are attached to the illumination devices 211 to 213, respectively. A wireless IC tag 220a is attached to the air conditioner 220. A wireless IC tag 230a is attached to the television set 230. A wireless IC tag 240a is attached to the audio equipment 240. The wireless IC tags (radio-frequency identification tags) attached to such electrical devices are a kind of storage media that electronically stores control codes and the like used for remotely controlling the corresponding electrical devices. The information stored in the wireless IC tags is read out by a reader/writer through near field communication. Information may be written into the wireless IC tag through near field communication by the reader/writer.

The mobile phone 200 performs a voice call or data communication with various information processing devices through a communication path that is connected through a base station or the like. The mobile phone 200 serves as a remote control device that is used for remotely controlling electrical devices such as the illumination device 211 and the like. The mobile phone 200 includes the reader/writer, and supports the remote control of an arbitrary electrical device by reading out a control code and the like by the reader/writer from the wireless IC tag that is attached to the electrical device.

As above, the mobile phone 200 acquires information used for remotely controlling the electrical devices from the wireless IC tags attached to the electrical devices. Accordingly, a user can allow the mobile phone 200 to support the remote control of an arbitrary electrical device by allowing the mobile phone 200 to read out the information stored in the wireless IC tag that is attached to the electrical device desired to be remotely controlled without performing a complicated operation of inputting the model number of the electrical device. The configuration of the remote control system 2 illustrated in FIG. 13 is an example, and the types and the number of electrical devices that are remotely controlled are not limited thereto.

Figure 14:
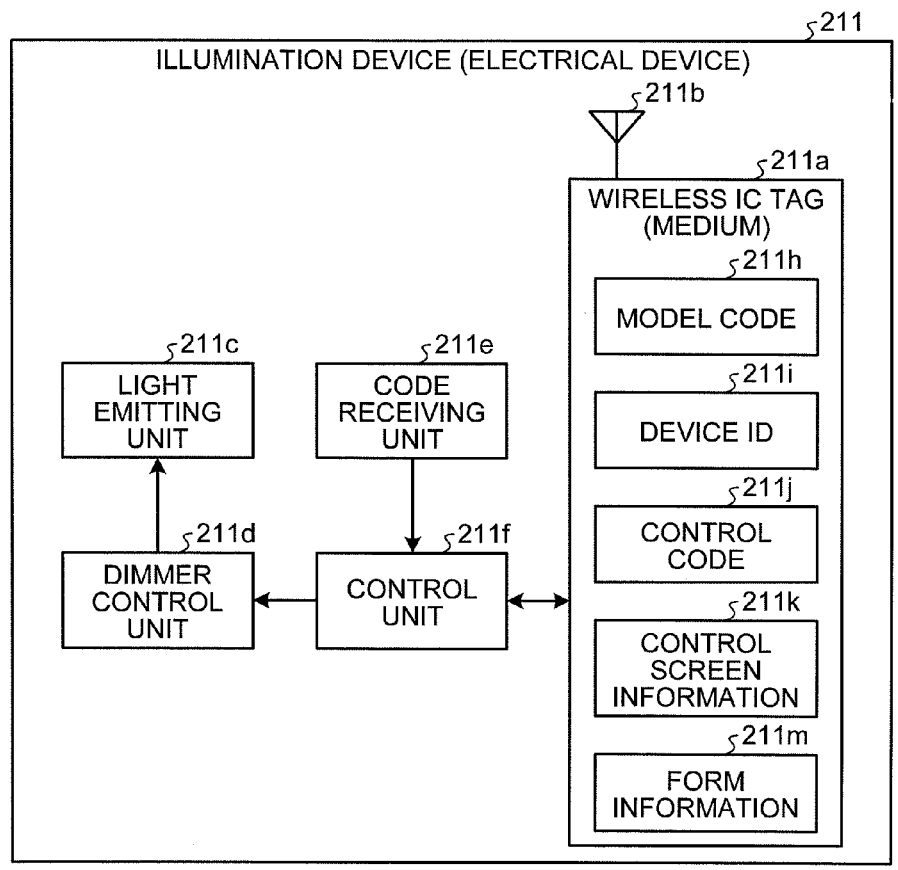
FIG. 14 is a block diagram of an illumination device according to the second embodiment.

Then, the configuration of the illumination device 211 illustrated in FIG. 13 will be described. The other electrical devices illustrated in FIG. 13 also have the same configuration relating to the remote control as that of the illumination device 211. FIG. 14 is a block diagram of the illumination device 211. As illustrated in FIG. 14, the illumination device 211 includes a wireless IC tag 211a, a light emitting unit 211c, a dimmer control unit 211d, a code receiving unit 211e, and a control unit 211f.

The wireless IC tag 211a includes an antenna 211b that is used for communicating with the reader/writer. The wireless IC tag 211a stores various types of information relating to the remote control of the self device (the illumination device 211) to which it belongs, and transmits the information to the reader/writer upon a request. The information stored in the wireless IC tag 211a includes a model code 211h, a device ID 211i, a control code 211j, control screen information 211k, and form information 211m. The information stored in the wireless IC tag 211a may be also read out by the control unit 211f through a wired interface.

The model code 211h is a kind of the identification information, and is used for identifying the model of the illumination device 211. The device ID 211i is a kind of the identification information and is used for identifying the individual illumination device 211. In other words, in a case where the illumination devices 211 to 213 are of the same model, while the values of the model codes 211h stored in the wireless IC tags 211a to 213a attached to the respective electrical devices are the same, the values of the device IDs 211i are different from each other. The control code 211j is a code that is used for remotely controlling the function of the illumination device 211. The control screen information 211k includes various definitions for realizing the control screen used for the illumination device 211. The form information 211m includes information that represents the features of the illumination device 211 in the appearance such as the shape, the color, and the like.

The light emitting unit 211c allows a light source such as a fluorescent lamp, a bulb, or an LED to emit light. The dimmer control unit 211d adjusts the brightness of the light emitting unit 211c. The code receiving unit 211e receives a control code through a wireless communication within a relatively short range such as a wireless LAN or Bluetooth (registered trademark).

The control unit 211f controls the overall operation of the illumination device 211. For example, the control unit 211f changes the brightness of the light emitting unit 211c by controlling the dimmer control unit 211d based on a control code received by the code receiving unit 211e. In a case where a control code is received by the code receiving unit 211e, the control unit 211f compares the device ID received together with the control code with the device ID 211i that is stored in the wireless IC tag 211a. Then, when the both device IDs do not coincide with each other, the control unit 211f does not perform a control operation based on the control code. By checking the device ID as above, it is correctly determined whether a control code received through wireless communication having no directivity is for the illumination device 211, whereby a malfunction can be suppressed.

Figure 15:
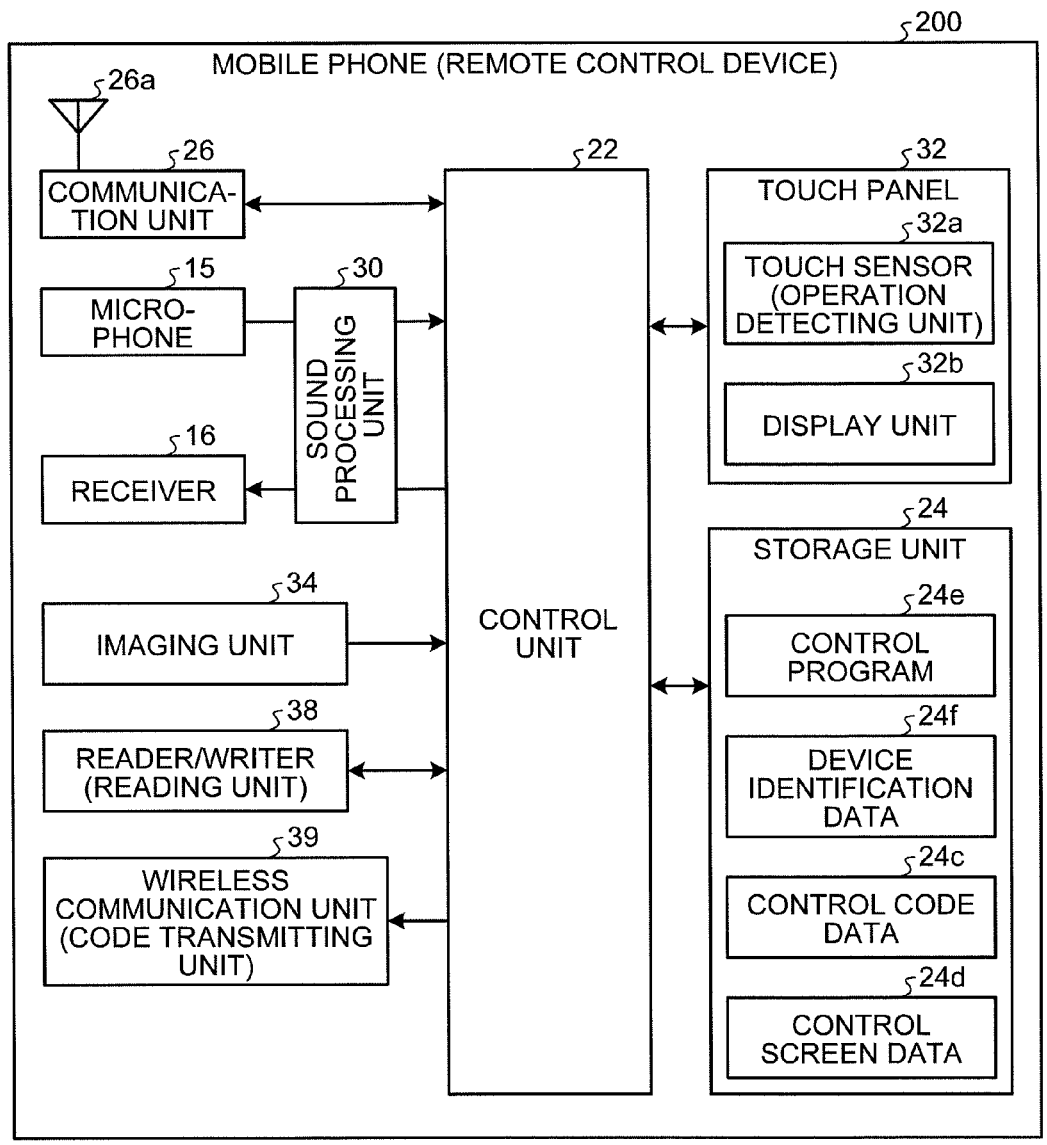
FIG. 15 is a block diagram of a mobile phone according to the second embodiment.

Then, the configuration of the mobile phone 200 illustrated in FIG. 13 will be described with reference to FIG. 15. FIG. 15 is a block diagram of the mobile phone 200. As illustrated in FIG. 15, the mobile phone 200 includes a communication unit 26, a sound processing unit 30, a touch panel 32, an imaging unit 34, a reader/writer 38, a wireless communication unit 39, a control unit 22, and a storage unit 24.

The reader/writer 38 reads or writes information of the wireless IC tag through near field communication. The reader/writer 38 also serves as a reading unit that is used for reading out information used for remote control from a wireless IC tag attached to an electrical device. The wireless communication unit 39 communicates with other devices through wireless communication within a relatively short range such as a wireless LAN, Bluetooth, or the like. The wireless communication unit 39 also serves as a code transmitting unit that transmits a control code to the electrical device.

It is preferable that the wireless communication unit 39 have a communicable range of about 10 m, so that the mobile phone 200 can remotely control an electrical device located inside the same room even in a case where the mobile phone 200 is located at any position in the living room. On the other hand, the reader/writer 38 may have a communicable range of only about 10 cm like near field communication (NFC).

The programs and the data that are stored in the storage unit 24 include a control program 24e, device identification data 24f, control code data 24c, and control screen data 24d. The control program 24e provides functions for controlling each unit of the mobile phone 200. The functions provided by the control program 24e include a function of operating the mobile phone 200 as a remote control device. The function of operating the mobile phone 200 as a remote control device will be described later in detail.

The device identification data 24f is used for identifying an electrical device as a control target. An example of the device identification data 24f is illustrated in FIG. 16. As illustrated in FIG. 16, in the device identification data 24f, the form information and the device ID are registered in association with a model code. In the device identification data 24*f*, the feature information is registered in association with the device ID.

The model code is identification information used for identifying the model of an electrical device. The form information includes information that represents the features of an electrical device in the appearance such as a shape and a color. The device ID is identification information that is used for identifying an individual electrical device. In a case where a plurality of electrical devices of the same model is set as control targets, a plurality of device IDs is associated with one model code in the device identification data 24*f*. The feature information includes information that represents the features of an electrical device and the vicinity thereof, on which the electrical device is installed, in the appearance such as shapes and colors.

Figure 17:
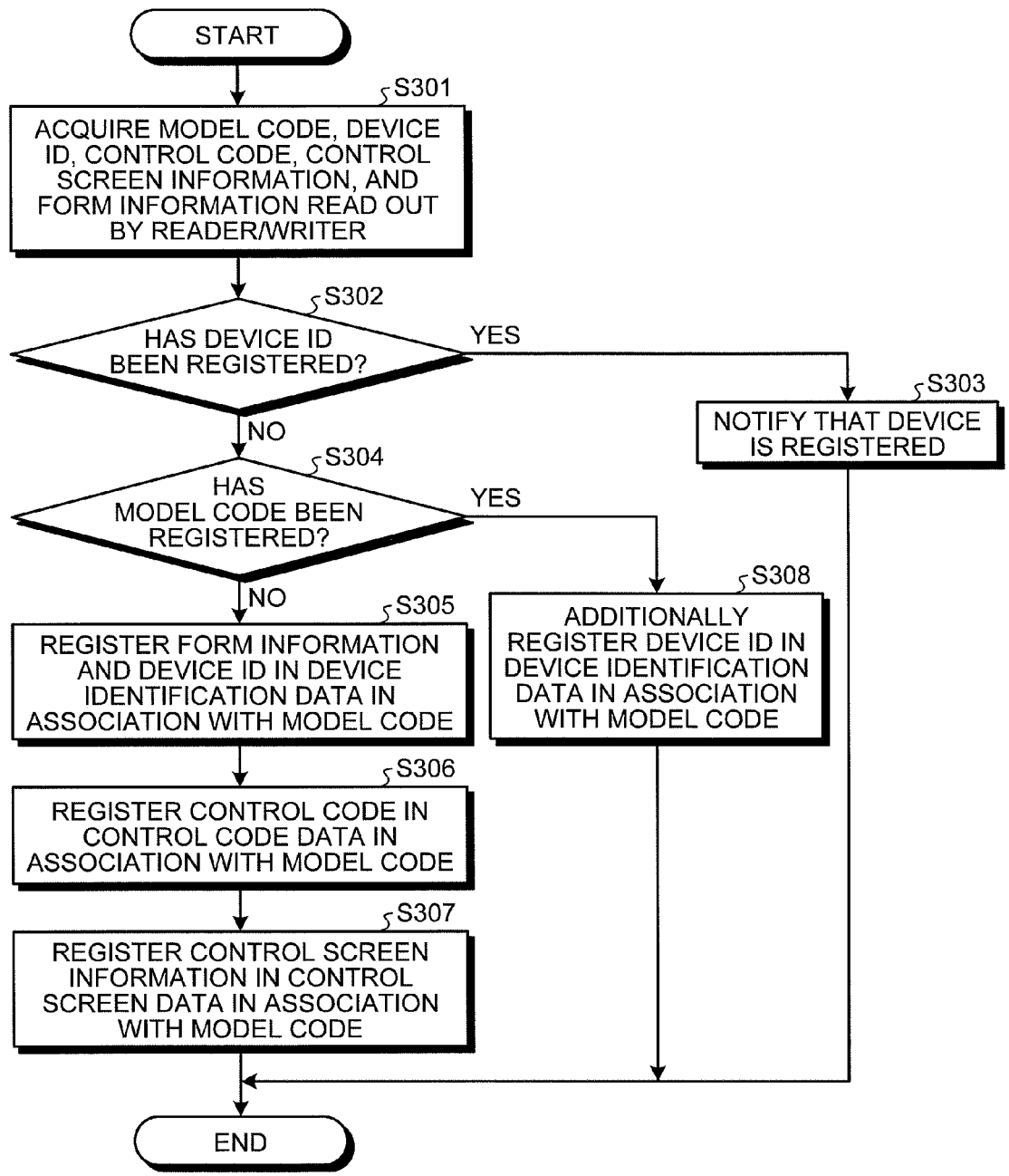
FIG. 17 is a flowchart illustrating the processing sequence of the mobile phone at the time of registering information used for the remote control of an electrical device.

Then, the operation of the mobile phone 200 relating to the remote control of an electrical device will be described with reference to FIGS. 17 to 19. FIG. 17 is a flowchart illustrating the processing sequence of the mobile phone 200 at the time of registering information used for remotely controlling an electrical device. The processing sequence illustrated in FIG. 17 is triggered by allowing the reader/writer 38 to read the information of the wireless IC tag by user's holding the mobile phone 200 over the wireless IC tag attached to the electrical device or the like and is performed based on the control program 24*e*.

As illustrated in FIG. 17, the control unit 22 acquires a model code, a device ID, a control code, control screen information, and form information that are read out from the wireless IC tag by the reader/writer 38, at Step S301. Then, the control unit 22 determines whether the acquired device ID has been registered by referring to the device identification data 24*f*, at Step S302. When the acquired device ID has been registered (Yes in Step S302), the control unit 22 notifies that the electrical device has been registered, at Step S303.

When the acquired device ID has not been registered (No in Step S302), the control unit 22 determines whether the acquired model code has been registered by referring to the device identification data 24*f*, at Step S304. When the acquired device code has not been registered (No in Step S304), the control unit 22 registers the form information and the device ID, which have been acquired, in the device identification data 24*f* in association with the model code, at Step S305. The control unit 22 registers the acquired control code in the control code data 24*c* in association with the model code at Step S306, and registers the acquired control screen information in the control screen data 24*d* in association with the model code at Step S307.

When the acquired model code has been registered (Yes in Step S304), the control unit 22 additionally registers the acquired type ID in the device identification data 24*f* in association with the model code that has been registered, at Step S308.

Figure 18:
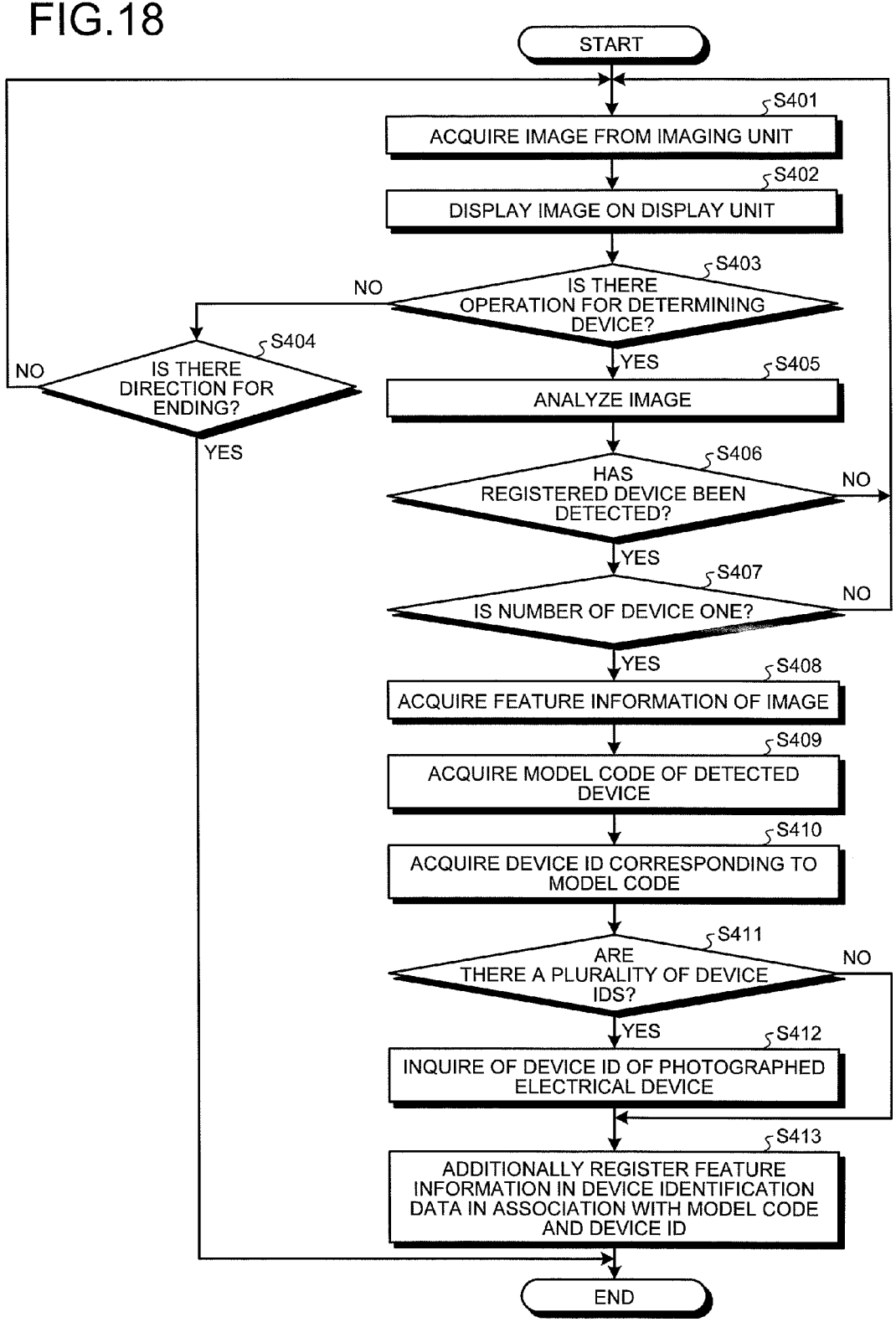
FIG. 18 is a flowchart illustrating the processing sequence of the mobile phone at the time of registering feature information.

FIG. 18 is a flowchart illustrating the processing sequence of the mobile phone 200 at the time of registering feature information. The processing sequence illustrated in FIG. 18 is triggered by detecting a predetermined operation directing the start of a feature information registration process by using the touch sensor 32*a* and is performed based on the control program 24*e*.

As illustrated in FIG. 18, the control unit 22 acquires an image from the imaging unit 34 at Step S401, and displays the image on the display unit 32*b* at Step S402. At this time, the control unit 22 performs display of a message and the like for the display unit 32*b* together with the image, so as to urge a user to perform a predetermined operation for directing the determination of the electrical device when an electrical device as a registration processing target is included in the image. Then, the control unit 22 determines whether the predetermined operation directing the determination of the electrical device has been detected, at Step S403.

When the predetermined operation directing the determination of the electrical device has not been detected (No in Step S403), the control unit 22 determines whether a predetermined operation directing the end of the process has been detected, at Step S404. When the predetermined operation directing the end of the process has been detected (Yes in Step S404), the control unit 22 ends the process. When the predetermined operation directing the end of the process has not been detected (No in Step S404), the control unit 22 performs Step S401 and the subsequent steps.

When the predetermined operation directing the determination of the electrical device has been detected (Yes in Step S403), the control unit 22 tries to detect an electrical device included in the image by analyzing the image acquired from the imaging unit 34, at Step S405. The detection of an electrical device is realized by comparing the form information, which is registered in the device identification data 24*f*, with the image. Accordingly, only the electrical devices of which information is registered in the device identification data 24*f* are detected at Step S405.

Subsequently, the control unit 22 determines whether an electrical device that has been registered in the image is detected through an analysis of the image at Step S406. When the electrical device has not been detected (No in Step S406), the control unit 22 re-performs Step S401 and the subsequent steps.

When the electrical device has been detected (Yes in Step S406), the control unit 22 determines whether the number of the detected electrical devices is one, at Step S407. When the number of the detected electrical devices is not one (No in Step S407), the control unit 22 re-performs Step S401 and the subsequent steps.

When the number of the detected electrical devices is one, in other words, when the electrical device as the control target is specified (Yes in Step S407), the control unit 22 acquires feature information of the image acquired from the imaging unit 34, at Step S408. Then, the control unit 22 acquires the model code of the detected electrical device from the device identification data 24*f*, at Step S409. The control unit 22 acquires the device ID corresponding to the model code from the device identification data 24*f*, at Step S410.

When a plurality of device IDs is acquired (Yes in Step S411), the control unit 22 inquires of the device ID of the photographed electrical device by displaying a list of the acquired device IDs on the display unit 32*b* or the like, at Step S412. Then, the control unit 22 additionally registers the feature information in the device identification data 24*f* in association with the model code and the selected device ID, at Step S413. When one device ID is acquired (No in Step S411), the control unit 22 additionally registers the feature information in the device identification data 24*f* in association with the model code and the acquired device ID, at Step S413.

Figure 19:
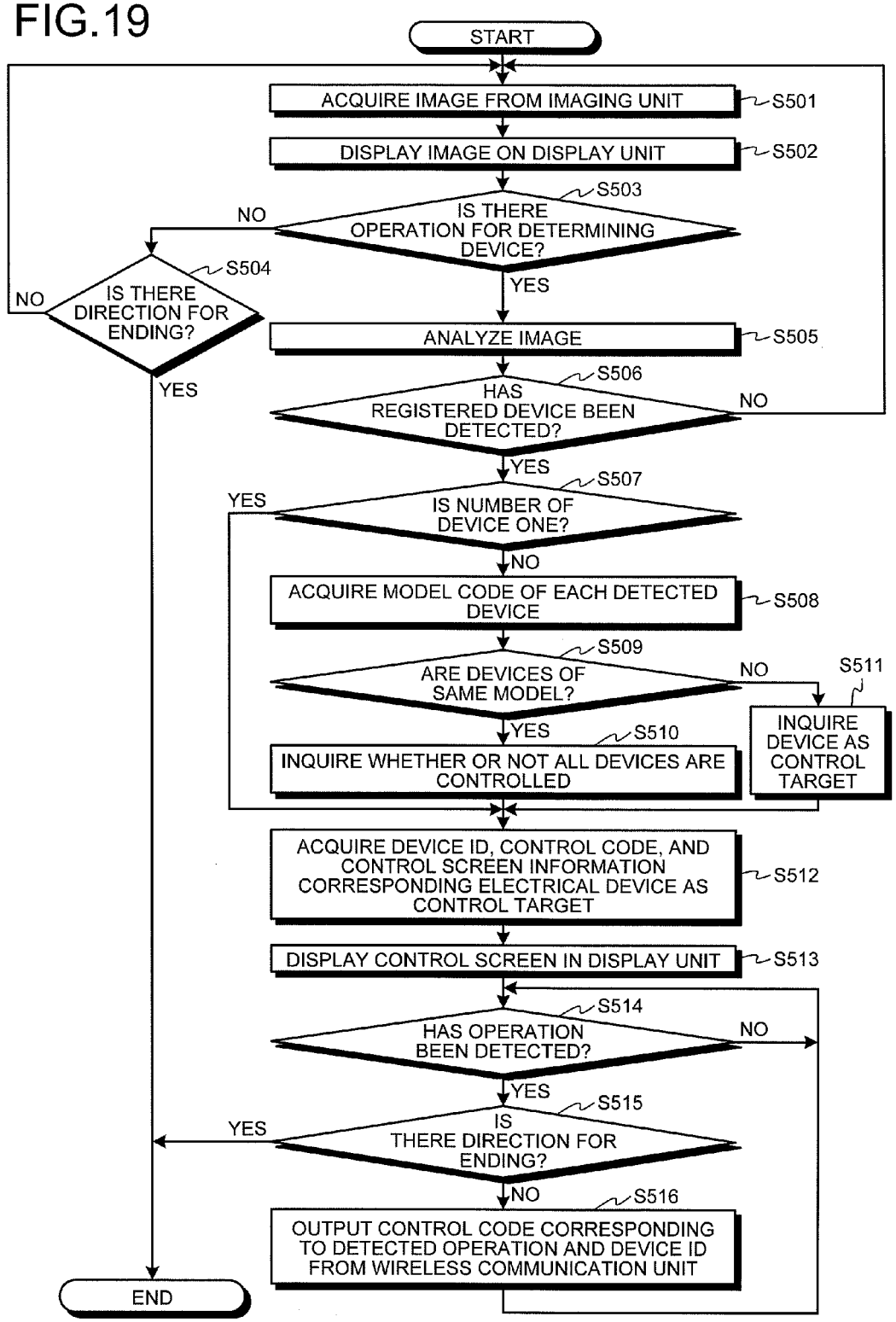
FIG. 19 is a flowchart illustrating the processing sequence of the mobile phone in a case where an electrical device is remotely controlled.

FIG. 19 is a flowchart illustrating the processing sequence of the mobile phone 200 in a case where an electrical device is remotely controlled. The processing sequence illustrated in FIG. 19 is triggered by the detection of a predetermined operation directing the start of remote control of an electrical device by using a touch sensor 32*a* and is performed based on the control program 24*e*.

As illustrated in FIG. 19, the control unit 22 acquires an image from the imaging unit 34 at Step S501, and displays the image on the display unit 32*b* at Step S502. At this time, the control unit 22, for example, displays the image in the image display area 41 of the control screen, and inquires a user whether the electrical device that is currently displayed is determined as a control target in the operation area 42.

Subsequently, the control unit 22 determines whether the predetermined operation determining an electrical device as a control target has been detected, at Step S503. When the predetermined operation determining an electrical device as the control target has not been detected (No in Step S503), the control unit 22 determines whether a predetermined operation directing the end of the process has been detected, at Step S504. When the predetermined operation directing the end of the process has been detected (Yes in Step S504), the control unit 22 ends the process. When the predetermined operation directing the end of the process has not been detected (No in Step S504), the control unit 22 re-performs Step S501 and the subsequent steps.

When the predetermined operation determining an electrical device as the control target has been detected (Yes in Step S503), the control unit 22 tries to detect an electrical device included in the image by analyzing the image acquired from the imaging unit 34, at Step S505. The detection of an electrical device is realized by comparing the form information and the feature information, which are registered in the device identification data 24f, with the image. By using the feature information, even in a case where there is a plurality of electrical device of the same model, each electrical device can be determined.

Subsequently, the control unit 22 determines whether an electrical device is detected within the image through the analysis of the image, at Step S506. When an electrical device has not been detected (No in Step S506), the control unit 22 re-performs Step S501 and the subsequent steps.

When an electrical device has been detected (Yes in Step S506), the control unit 22 determines whether the number of the detected electrical devices is one, at Step S507. When the number of the detected electrical devices is one, in other words, when the electrical device as the control target is specified (Yes in Step S507), the control unit 22 acquires the device ID of the electrical device as the control target from the device identification data 24f, at Step S512. In addition, the control unit 22 acquires a control code corresponding to the electrical device as the control target from the control code data 24c, and acquires control screen information corresponding to the electrical device as the control target from the control screen data 24d. Then, the control unit 22 displays a control screen used for the electrical device as the control target on the display unit 32b based on the acquired control screen information, at Step S513.

Subsequently, the control unit 22 determines whether an operation for the control screen has been detected, at Step S514. When an operation has not been detected (No in Step S514), the determination performed in Step S514 is performed again. When an operation has been detected (Yes in Step S514), the control unit 22 detects whether the detected operation is a predetermined operation directing the end of the process, at Step S515. When the detected operation is the predetermined operation directing the end of the process (Yes in Step S515), the control unit 22 ends the process.

When the detected operation is not the predetermined operation directing the end of the process (No in Step S515), the control unit 22 outputs a control code corresponding to the detected operation and a device ID from the wireless communication unit 39, at Step S516. Thereafter, the control unit 22 re-performs Step S514 and the subsequent steps.

When the number of electrical devices detected from the image is not one but two or more (No in Step S507), the control unit 22 acquires model codes of the detected electrical devices from the device identification data 24f, at Step S508. Then, the control unit 22 compares the acquired model codes with each other and determines whether the detected electrical devices are of the same type based on the result of the comparison, at Step S509.

When the detected electrical devices are of the same type (Yes in Step S509), the control unit 22 inquires the user whether all the detected electrical devices are controlled, at Step S510. Then, the control unit 22 performs Step S512 and the subsequent steps described above. When the user selects to control all the detected electrical devices at Step S510, the control unit 22 transmits control codes used for all the detected electrical devices, at Step S516. In a case where the control codes used for a plurality of electrical devices are transmitted, a control code and a device ID may be transmitted a plurality of times, or one control code and a plurality of device IDs may be transmitted in association with each other.

When the detected electrical devices are not of the same type (No in Step S509), the control unit 22 inquires the user of an electrical device that is the control target and determines the electrical device selected by the user as the control target, at Step S511. The inquiry for the user is realized, for example, by displaying a predetermined screen on the display unit 32b. Then, the control unit 22 performs Step S512 and the subsequent steps described above.

Then, the operation of the illumination device 211 relating to remote control will be described with reference to FIG. 20. The other electrical devices illustrated in FIG. 13 perform the same operation relating to remote control as that of the illumination device 211. FIG. 20 is a flowchart illustrating the processing sequence of the illumination device 211 at the time of remote control. The processing sequence illustrated in FIG. 20 is performed when a device ID and a control code transmitted form the mobile phone 200 is received by the code receiving unit 211e.

As illustrated in FIG. 20, the control unit 211f acquires the device ID and the control code received by the code receiving unit 211e, at Step S601. Then, the control unit 211f acquires the device ID of the self device to which the control unit 211f belongs from the wireless IC tag 211a, at Step S602. When the received device ID coincides with the device ID acquired from the wireless IC tag 211a (Yes in Step S603), the control unit 211f performs control corresponding to the received control code, at Step S604. When the received device ID does not coincide with the device ID acquired from the wireless IC tag 211a (No in Step S603), the control unit 211f ignores the received control code.

As described above, in the second embodiment, since the mobile phone 200 acquires information used for remote control from the wireless IC tag attached to the electrical device, the user can easily register the information used for remote control in the mobile phone 200. In addition, in the second embodiment, since the device ID used for individually identifying the electrical device is transmitted together with the control code, the user can remotely control individual electrical devices without caring about the transmission direction of the control code.

In the above-described embodiment, the mobile phone 200 reads out the device ID from the wireless IC tag attached to the electrical device; however, the mobile phone 200 may be configured to generate a device ID so as not to overlap with those of the other electrical devices and to write the device ID into the wireless IC tag. By employing such a configuration, a maker does not need to assign a unique device ID to each electrical device, whereby the cost is reduced.

In the above-described embodiment, the wireless communication unit 39 transmits a control code; however, the reader/writer 38 may be used as a transmitting unit of the control code if the reader/writer 38 can transmit electric waves to a sufficiently wide range and the wireless IC tag attached to the electrical device can receive the electric waves. In such a case, the mobile phone 200 may not include the wireless communication unit 39, and the electrical device such as the illumination device 211 may not include the code receiving unit 211*e*.

The configurations of the above-described embodiments may be appropriately combined. For example, the remote control device may be configured such that a device ID is read out from the wireless IC tag as described in the second embodiment, and the control code is transmitted by using infrared rays as described in the first embodiment.

Furthermore, the configuration of each embodiment described above may be arbitrarily modified in the range not departing from the spirit of the invention. For example, in each embodiment described above, an example has been described in which a device including a touch sensor is used as the remote control device; however, the present invention also can be applied to a device that does not include a touch sensor. For example, in a case where a device that includes an operation detecting unit configured by mechanical buttons is used as the remote control device, functions assigned to the buttons may be displayed on the control screen.

In each embodiment described above, an example has been described in which a control code used for controlling the electrical device is transmitted through infrared rays or electric waves; however, the system for transmitting the control code is not limited thereto. For example, the control code may be transmitted by using ultrasonic waves or visible light.

In each embodiment described above, the form information and the feature information are used for identifying an electrical device included in an image; however, the electrical device included in the image may be identified by using one of the form information and the feature information.

The advantages are that one embodiment of the invention provides a remote control device, a remote control system, a storage medium storing therein a control program, and a medium to be attached to an electrical device that allow the user to control electrical devices easily.

What is claimed is:

1. A remote control device, comprising:
   a display unit;
   an operation detecting unit configured to detect an operation;
   a reading unit configured to read information used for remotely controlling an electrical device from the electrical device;
   a control unit configured to cause the display unit to display a control screen used for remotely controlling the electrical device based on the information read by the reading unit;
   a code transmitting unit configured to transmit a control code acquired based on the information read by the reading unit to the electrical device in response to an operation detected by the operation detecting unit while the control screen is displayed on the display unit; and
   an imaging unit configured to photograph an image including images of a plurality of electrical devices to be remotely controlled,
   wherein
   the code transmitting unit has
      a low directivity transmitting sub-unit configured to transmit the control code with a low directivity, and
      a high directivity transmitting sub-unit configured to transmit the control code with a high directivity which is higher than the low directivity of the low directivity transmitting sub-unit,
   the control unit is further configured to
      when the plurality of electric devices is detected in the image photographed by the imaging unit,
         select the low directivity transmitting sub-unit, in case of transmitting a same control code to the plurality of electrical devices detected within said image when the electrical devices are a same model, and
         select the high directivity transmitting sub-unit, in case of transmitting the control code to one of the plurality of electrical devices detected within said image,
      cause the display unit to display the control screen including said image, and
      when the high directivity transmitting sub-unit is selected, cause the display unit to represent (i) a transmission range of the control code and (ii) a range outside the transmission range, on the displayed image in accordance with the high directivity.

2. The remote control device according to claim 1, wherein the control unit is configured to acquire the control code from the information read by the reading unit.

3. The remote control device according to claim 1, further comprising a communication unit, wherein
   the control unit is configured to acquire the control code through data communication performed by the communication unit based on identification information of the electrical device that is included in the information read by the reading unit.

4. The remote control device according to claim 3, wherein the identification information includes image information of the electrical device.

5. The remote control device according to claim 1, wherein the control unit is configured to cause the display unit to display the control screen used for remotely controlling the electrical device when the electrical device is detected within the image photographed by the imaging unit.

6. The remote control device according to claim 5, wherein the control unit is configured to detect the electrical device included in the image based on form information which is (i) registered with the electrical device and (ii) acquired based on the information read by the reading unit.

7. The remote control device according to claim 1, wherein the information used for remotely controlling the electrical device is read from an image of the electrical device photographed by the imaging unit, and
   the control unit is configured to
      register the electrical device together with feature information of the image that is photographed for reading the information used for remotely controlling the electrical device, wherein the feature information includes information representing an appearance of a vicinity of the electrical device, and
      cause the display unit to display the control screen used for remotely controlling the electrical device when the electrical device is detected in the image photographed by the imaging unit based on the feature information registered with the electrical device.

8. The remote control device according to claim 1, wherein the code transmitting unit is a projection portion of a projector.

9. The remote control device according to claim 1, wherein the control unit is further configured to register the electrical device together with form information which includes information representing an appearance of the electrical device.

10. A remote control device, comprising:
a display unit;
an imaging unit;
a control unit configured to cause the display unit to display an image photographed by the imaging unit;
an operation detecting unit;
a reading unit configured to read information used for remotely controlling an electrical device as a target device from the electrical device; and
a code transmitting unit configured to transmit a control code acquired based on the information read by the reading unit to the electrical device in response to an operation detected by the operation detecting unit;
wherein the control unit is configured to
 determine whether there is a plurality of target devices which are not a same model within the photographed image, and
 when the control unit determines there is said plurality of target devices which are not a same model within said photographed image,
  cause the display unit to display a transmission range of the control code on the image in such a manner that the transmission range is superimposed on said photographed image.

11. The remote control device according claim 10, further comprising:
a storage unit configured to store identification information, which is included in the information read by the reading unit, for identifying a target device;
wherein the control unit is configured to
 acquire feature information that represents an appearance of a vicinity of the target device, upon detecting said target device corresponding to the identification information,
 cause the storage unit to store the acquired feature information by adding the acquired feature information to the identification information, and
 cause the code transmitting unit to transmit the control code to the target device, when said target device is detected in the photographed image corresponding to the feature information.

12. The remote control device according claim 10, wherein the control unit is configured to cause the display unit to display a control screen used for remotely controlling the target device based on the information read by the reading unit; and
the code transmitting unit is configured to transmit the control code to the target device according to the operation detected by the operation detecting unit, while the control screen is displayed.

* * * * *